United States Patent
Taylor

(10) Patent No.: US 10,272,986 B2
(45) Date of Patent: Apr. 30, 2019

(54) THERMALLY CONDUCTIVE UNMANNED AERIAL VEHICLE AND METHOD OF MAKING SAME

(71) Applicant: Rapid Unmanned Aerial Systems, LLC, Myakka City, FL (US)

(72) Inventor: Alan Taylor, Myakka City, FL (US)

(73) Assignee: RAPID UNMANNED AERIAL SYSTEMS, LLC, Myakka City, FL (US)

(*) Notice: Subject to any disclaimer, the term of this patent is extended or adjusted under 35 U.S.C. 154(b) by 417 days.

(21) Appl. No.: 14/881,117

(22) Filed: Oct. 12, 2015

(65) Prior Publication Data

US 2016/0194069 A1 Jul. 7, 2016

Related U.S. Application Data

(60) Provisional application No. 62/129,318, filed on Mar. 6, 2015, provisional application No. 62/062,699, filed on Oct. 10, 2014, provisional application No. 62/062,708, filed on Oct. 10, 2014.

(51) Int. Cl.
| | |
|---|---|
| *B64C 1/38* | (2006.01) |
| *B64C 39/02* | (2006.01) |
| *B64C 27/08* | (2006.01) |
| *B64F 5/10* | (2017.01) |
| *B64C 1/00* | (2006.01) |

(52) U.S. Cl.
CPC ............ *B64C 1/38* (2013.01); *B64C 27/08* (2013.01); *B64C 39/024* (2013.01); *B64F 5/10* (2017.01); *B64C 2001/0054* (2013.01); *B64C 2001/0072* (2013.01); *B64C 2201/027* (2013.01); *B64C 2201/042* (2013.01); *Y02T 50/43* (2013.01)

(58) Field of Classification Search
CPC .......... B64C 1/38; B64C 27/08; B64C 39/024
See application file for complete search history.

(56) References Cited

U.S. PATENT DOCUMENTS

| | | | |
|---|---|---|---|
| 7,472,863 B2* | 1/2009 | Pak .................. | A63H 27/14 244/12.5 |
| 7,699,261 B2* | 4/2010 | Colten .............. | B64C 39/024 244/45 R |
| 8,052,081 B2* | 11/2011 | Olm .................. | B64C 39/024 244/17.23 |

(Continued)

FOREIGN PATENT DOCUMENTS

| | | |
|---|---|---|
| CN | 202609080 | * 12/2012 |
| KR | 10-2010-0024869 | 3/2010 |

OTHER PUBLICATIONS

Search Report and Written Opinion; Corresponding PCT Application No. PCT/US2015/055174; dated Dec. 28, 2015; Authorized Officer Hwang, Chan Yoon.

(Continued)

*Primary Examiner* — Justin M Benedik
(74) *Attorney, Agent, or Firm* — Squire Patton Boggs (US) LLP

(57) ABSTRACT

An unmanned aerial vehicle includes a body and a heat source disposed in the body. The heat source includes at least one of an electronic controller system and a motor. The unmanned aerial vehicle further includes a plurality of rotor blades. At least a portion of the body is constructed of crystalline carbon fibers.

15 Claims, 31 Drawing Sheets

(56) References Cited

U.S. PATENT DOCUMENTS

| | | | | |
|---|---|---|---|---|
| 8,544,787 | B2* | 10/2013 | Lee | B64C 3/385 |
| | | | | 244/12.4 |
| 8,800,912 | B2* | 8/2014 | Oliver | B64C 29/0033 |
| | | | | 244/12.4 |
| 9,045,226 | B2* | 6/2015 | Piasecki | G05D 1/102 |
| 9,108,728 | B2* | 8/2015 | Shaw | B64C 27/20 |
| 9,187,174 | B2* | 11/2015 | Shaw | B64C 29/0033 |
| 2003/0062443 | A1* | 4/2003 | Wagner | B64C 3/56 |
| | | | | 244/12.3 |
| 2003/0080242 | A1* | 5/2003 | Kawai | B64C 11/001 |
| | | | | 244/12.4 |
| 2006/0226281 | A1* | 10/2006 | Walton | B64C 27/20 |
| | | | | 244/17.23 |
| 2012/0056041 | A1* | 3/2012 | Rhee | B64C 25/32 |
| | | | | 244/4 R |
| 2014/0099853 | A1* | 4/2014 | Condon | G05D 1/0033 |
| | | | | 446/37 |
| 2016/0129998 | A1* | 5/2016 | Welsh | B64C 39/024 |
| | | | | 244/12.3 |
| 2016/0244160 | A1* | 8/2016 | Colten | B64C 39/024 |

OTHER PUBLICATIONS

English Translation of previously cited CN202609080.

\* cited by examiner

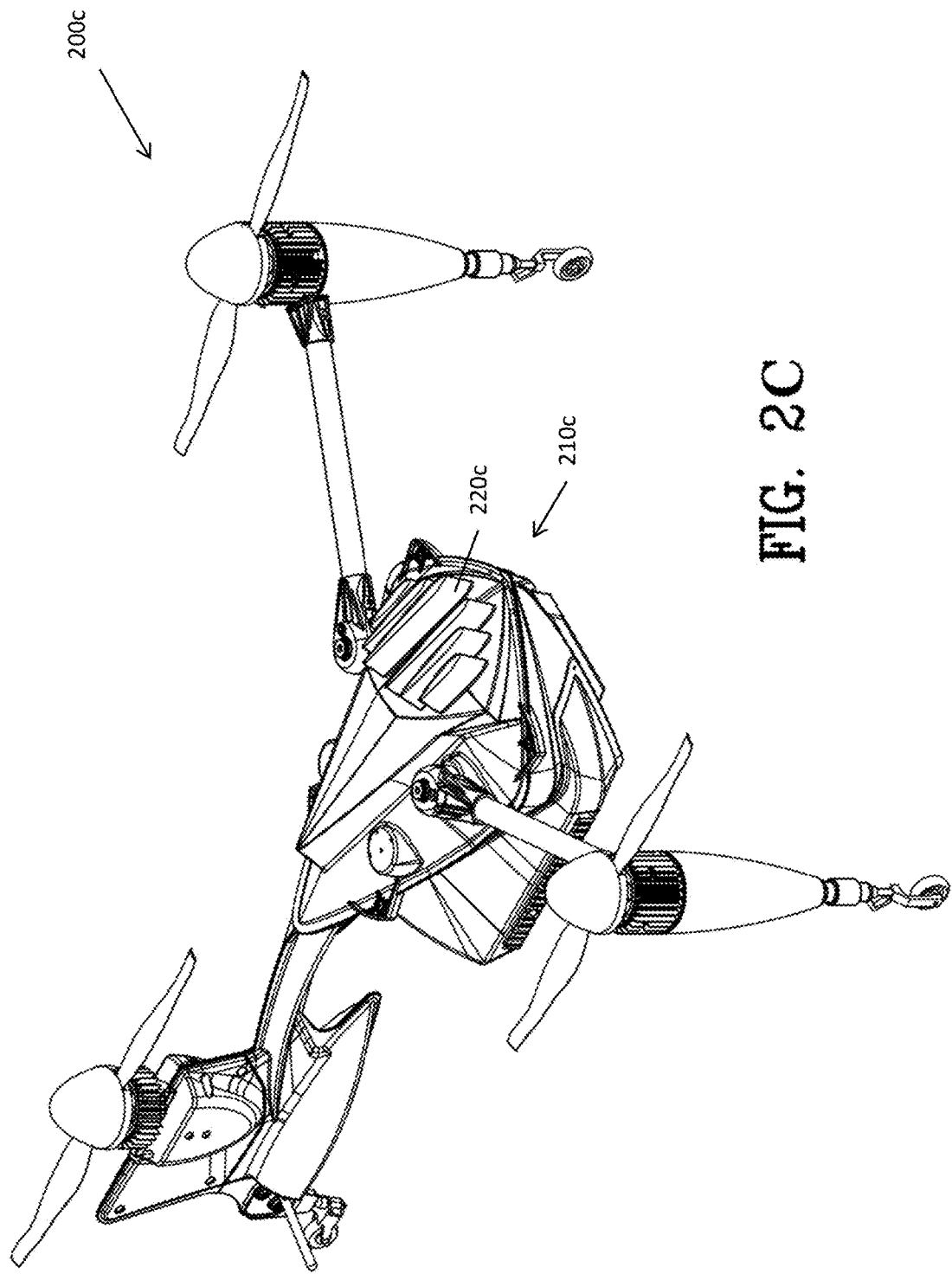

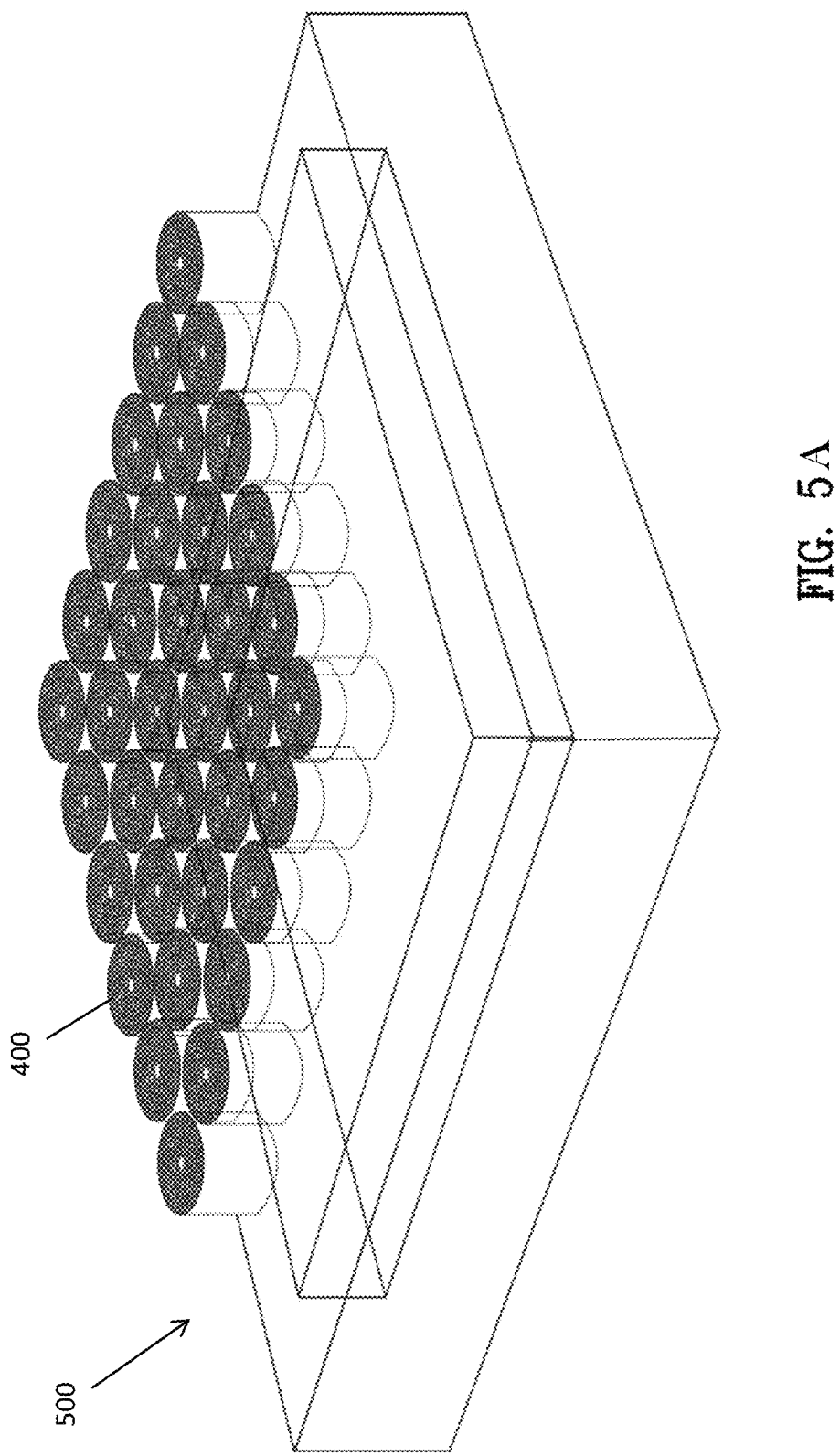

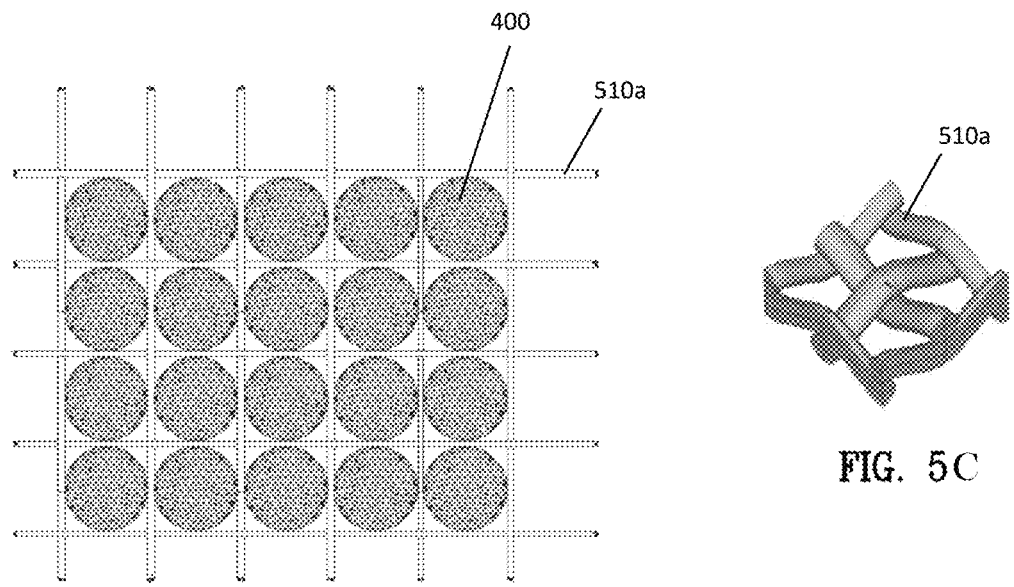
FIG. 5B
FIG. 5C
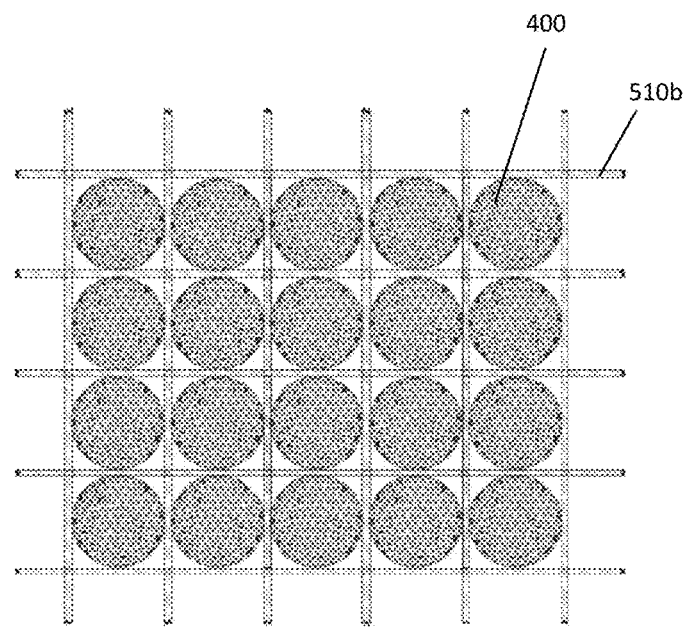
FIG. 5D

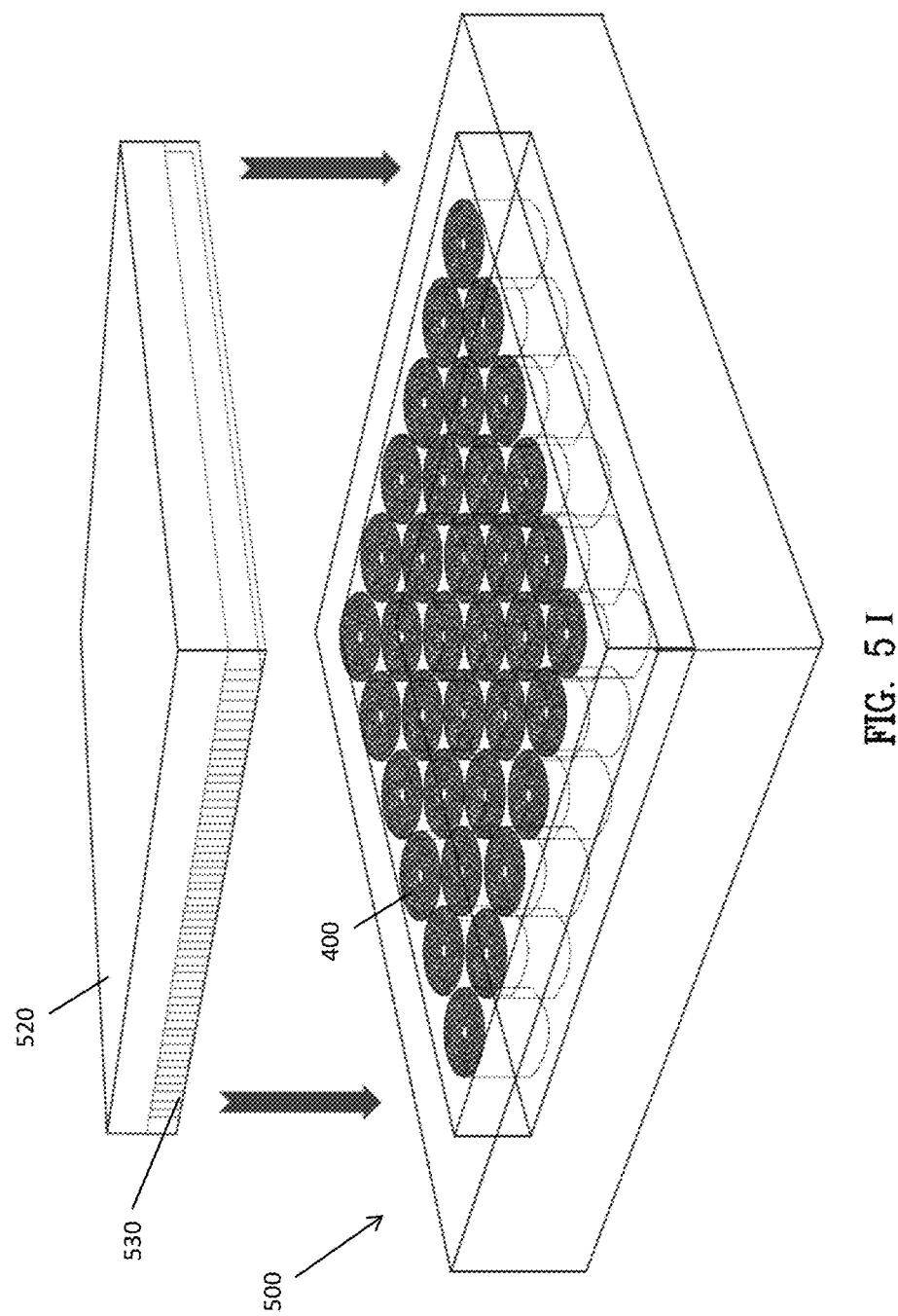

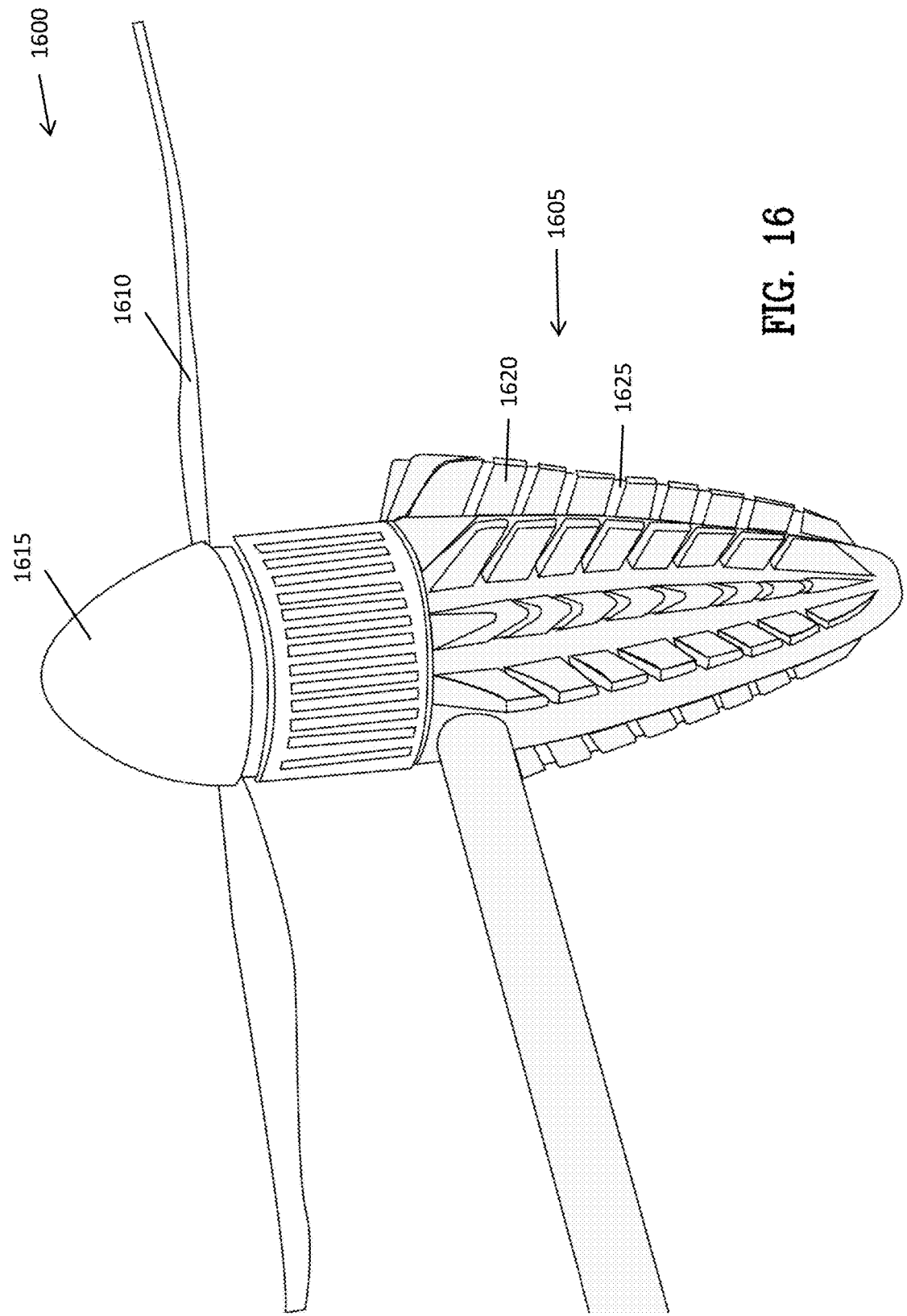

THERMALLY CONDUCTIVE UNMANNED AERIAL VEHICLE AND METHOD OF MAKING SAME

CROSS-REFERENCE TO RELATED APPLICATIONS

This application claims priority to U.S. Provisional Patent Application No. 62/062,708, filed on Oct. 10, 2014, the disclosure of which is incorporated by reference herein in its entirety.

This application also claims priority to U.S. Provisional Patent Application No. 62/062,699, filed on Oct. 10, 2014, the disclosure of which is incorporated by reference herein in its entirety.

This application also claims priority to U.S. Provisional Patent Application No. 62/129,318, filed on Mar. 6, 2015, the disclosure of which is incorporated by reference herein in its entirety.

FIELD OF INVENTION

The present disclosure is directed to an unmanned aerial vehicle. More particularly, the present disclosure is directed to an unmanned aerial vehicle having thermally conductive portions.

BACKGROUND

Unmanned aerial vehicles (UAV) are types of aircraft that fly with no pilot, crew, or passengers onboard. UAVs include both autonomous and remotely piloted vehicles. The earliest UAVs were balloons loaded with explosives, which were used by the Austrians in the mid-1800s. Shortly after World War I radio controlled aircraft were developed. Later developments in this technology led to more sophisticated UAVs which included remotely controlled UAVs as well as autonomously guided vehicles. As UAVs become more sophisticated, they may include more electronics, motors, and other heat sources. UAVs may also be operated for longer durations than their predecessors.

SUMMARY OF THE INVENTION

In one embodiment, an unmanned aerial vehicle includes a fuselage, an electronic controller system disposed in the fuselage, and a plurality of rotor lift assemblies connected to the fuselage. Each rotor lift assembly includes a plurality of rotor blades, a nose cone, and a nacelle housing a motor. At least a portion of one of the fuselage and nacelle is constructed of crystalline carbon fibers.

In an alternative embodiment, an unmanned aerial vehicle includes a body and a heat source disposed in the body. The heat source includes at least one of an electronic controller system and a motor. The unmanned aerial vehicle further includes a plurality of rotor blades. At least a portion of the body is constructed of crystalline carbon fibers.

In another alternative embodiment, a method of making an unmanned aerial vehicle includes forming a first part of a body from a first group of materials. The first group of materials includes at least one material selected from the group consisting of polyacrylonitrile fiber, aramid fibers, thermoplastic, thermoset, and boron nitride. The method also includes forming a second part of a body from a second group of materials. The second group of materials includes at least one material selected from the group consisting of pitch fiber, graphite, buckypaper, carbon nano materials, graphene, and PEMTEX. The method further includes connecting the first part of the body to the second part of the body.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 16 is a perspective view of yet another alternative embodiment of a rotor assembly.

DETAILED DESCRIPTION

Figure 1:
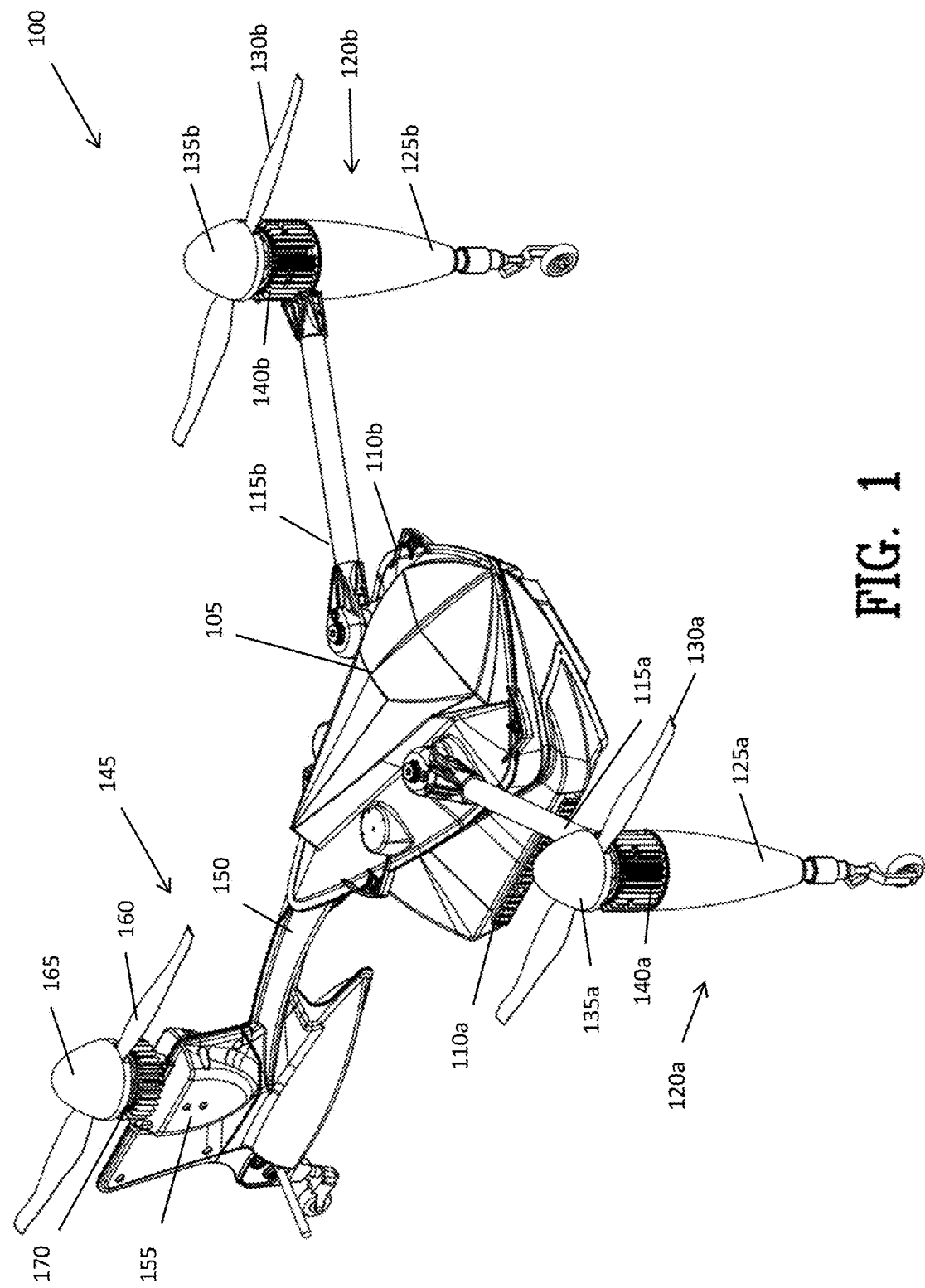
FIG. 1 is a perspective view of one embodiment of an unmanned aerial vehicle.

FIG. 1 illustrates one embodiment of an unmanned aerial vehicle (UAV) 100. The details of the UAV 100 and of alternative embodiments of UAVs are described in U.S. patent application Ser. No. 14/710,306, filed on May 12, 2015 by Rapid Unmanned Aerial Systems, LLC, the disclosure of which is incorporated by reference herein in its entirety. For convenience, certain details and images from that application are presented herewith. However, the reader should refer to the original application for a more fulsome description.

The UAV 100 includes a fuselage 105 having an exterior surface and an interior chamber for housing electronic or mechanical components such as electronic controls, speed controls, computer processors, computer memory, autopilot, communication devices (such as RF receivers, transmitters, or transceivers), cameras, motors, and a power source such as a battery (including lithium ion, gel polymer, hybrid, and fuel cell). The electronic or mechanical components may also have associated wires, resistors, capacitors, switches, circuit breakers, fuses, etc. Such electronic or mechanical components generate heat, and may be referred to as heat sources. In one embodiment, the fuselage 105 has a clamshell construction. The fuselage 105 may be constructed from a three or six piece construction methodology which is structurally bonded into two monocoques making a watertight seal. In alternative embodiments, the fuselage may be constructed of any number of pieces.

In the illustrated embodiment, the fuselage 105 further includes a first rail mount 110a and a second rail mount 110b, each configured to receive one or more exterior devices (not shown). The exterior devices may include, without limitation: light illumination devices (such as SureFire, Streamlight, Ledsniper or Wilcox), cameras, non-lethal weapons, lethal weapons, laser devices, and infrared devices. More particularly, the exterior devices may include, without limitation: target illuminators (such as B.E. Meyers, ELBIT, FLIR Systems, or Lockheed Martin), sensors, non-lethal compliance devices, tasers, counter IED measures, millimeter wave lasers, lidar, radar, multi-spectral sensor systems, gas vapor detectors, testing equipment, nuclear detectors, biological detectors, chemical detectors (NBC), first aid, emergency supplies, packages, net guns, kinetic energy devices, grenades, ordinance disposal, launchers, electro optical, gimbals, Boeing's TCCR module, other stabilized or non-stabilized intelligence, search, and rescue (ISR) devices, food, automated external defibrillator (AED), agriculture sensors, wireless 2-way voice communication and radio systems, and air or water sensing equipment. Other exterior devices should be readily apparent to those of ordinary skill in the art. Certain of the above-described exterior devices require a power source. Such devices may draw power from a primary power source of the UAV 100. Alternatively, such devices may have their own power sources. Many of the exterior devices described above will produce heat, and may therefore be referred to as heat sources.

A first boom 115a and a second boom 115b extend from the fuselage 105. The first and second booms 115a, 115b may be hollow and form a conduit for wires. The first and second booms 115a, 115b may also house other electrical or mechanical components. The wires or other components may generate heat, and are therefore referred to as heat sources. In the illustrated embodiment, the first and second booms 115a, 115b are rotatably connected to the fuselage 105. In an alternative embodiment (not shown) the booms are fixedly connected to the fuselage.

A first rotor assembly 120a is connected to the first boom 115a and a second rotor assembly 120b is connected to the second boom 115b. Each rotor assembly 120a, 120b includes a nacelle 125a, 125b, a plurality of rotor blades 130a, 130b, and a nose cone 135a, 135b. The nacelles 125a, 125b may house motors, controls, and other electronic or mechanical components. Such electronic or mechanical components generate heat and therefore may be referred to as heat sources. In the illustrated embodiment, the nacelles 125a, 125b include cooling fins 140a, 140b. In alternative embodiments, the cooling fins may be omitted.

A tail section 145 is also connected to the fuselage 105. The tail section 145 includes a tail 150, a housing 155, a plurality of rotor blades 160, and a nose cone 165. The housing 155 may house motors, controls, and other electronic or mechanical components. Such electronic or mechanical components generate heat and therefore may be referred to as heat sources. In the illustrated embodiment, the housing 155 includes cooling fins 170. In alternative embodiments, the cooling fins may be omitted.

The tail 150 may be hollow and form a conduit for wires. The first and second booms 115a, 115b may also house other electrical or mechanical components. The wires or other components may generate heat, and are therefore referred to as heat sources.

Certain components (or portions of certain components) of the body of the UAV 100 may be constructed of thermally conductive material. More specifically, some or all of the fuselage 150, first and second booms 115a, 115b, first and second rotor assemblies 120a, 120b, and tail section 145 may be manufactured from thermally conductive slurries, pre-pregs, quasi-isotropic structures, or thermally conductive rope structures. Some of the thermally conductive materials are particulates and others are fiber, which require orientation for optimal thermal conductivity. The fibers are most thermally conductive when oriented on their axis perpendicular to a heat source. The fiber can be purchased in uni-directional, bidirectional, tri-axial, woven, custom woven, braided, chopped and in milled forms. These materials may be infused with metal particles or fiber as well. The thermally conductive material may include crystalline carbon fibers. Exemplary crystalline carbon fibers include, without limitation: pitch fiber, graphite, buckypaper, carbon nano materials, graphene, PEMTEX. However, it should be understood that any type of crystalline carbon fiber may be employed.

The crystalline carbon fibers or other thermally conductive material can be combined with other materials such as polyacrylonitrile (PAN) fiber, aramid fibers (such as Kevlar), thermoplastic, and boron nitride (BN). The thermally conductive material may be provided in a matrix (i.e., a resin or binder). These matrix materials can be almost any thermoset or thermoplastic, including without limitation: epoxy, vinyl ester, PI, PA, TPU, PET, PU, PPS, and PEEK.

The type and ratio of materials may be selected based on characteristics that are desirable for a particular application. For example, pitch fiber may be selected as a first material because of its high thermal conductivity. However, while pitch fiber may have sufficiently high tensile strength for many applications, it may be too brittle for certain applications. Therefore, it may be desirable to select a resilient material as a second material. Other characteristics, such as strength, hardness, weight, cost, electrical conductivity, and stability may be considered in the selection of the materials.

The thermally conductive material permits the fuselage, wings and other control surfaces to be turned into heat sink structures. Other components constructed from thermally conductive material may include nose cones, nacelles, domes or engine pods. The thermally conductive material will provide the maximum surface area possible with superior laminar flow to heat sink solutions. Due to the size and cost of tooling, parts may be manufactured by using compression molding technology.

The components may be constructed by insert molding or compression molding in a vertical press. However, for better manufacturing throughput, for smaller parts, a faster horizontal injection style press, utilizing either a cooled barrel or heated mold for thermosets or a heated barrel with a cooled mold for thermoplastics may be used for construction.

In one embodiment, only selected portions of the body of the UAV are constructed of thermally conductive material. In one example, only portions of the body that are proximate to heat sources are constructed of thermally conductive material. In such an example, heat may be efficiently removed from the UAV, while maintaining structure integrity of the entire UAV.

In another example, a first portion of the body proximate to the heat source, and a second portion of the body distal from the heat source are constructed of thermally conductive material. A path from the first portion to the second portion is also constructed of thermally conductive material, and serves to "pipe" heat from the first portion and the second portion. The second portion may be at a location selected to reduce any negative impact on the aerodynamic performance of the UAV. For example, the second portion may be at a location where an increase of temperature would not adversely affect a laminar air flow. The second portion may also be at a location selected for efficiency. For example, the second portion may be proximate to the rotor blades, so that forced air from the spinning rotor blades aids in cooling the second portion.

Portions of the body of the UAV 100 are shaped to increase the surface area to volume ratio, and thus aid in removing heat from the UAV. For example, the cooling fins 140a, 140b on the rotor assemblies 120a, 120b and the cooling fins 170 on the tail section 145 may aid in removing heat from the UAV. In one embodiment, these cooling fins 140a, 140b, 170 are constructed of thermally conductive material.

In alternative embodiments, additional portions of a UAV body may be shaped to increase the surface area to volume ratio, and thus aid in removing heat from the UAV. Examples of some such embodiments are shown in FIGS. 2A-2D.

Figure 2A:
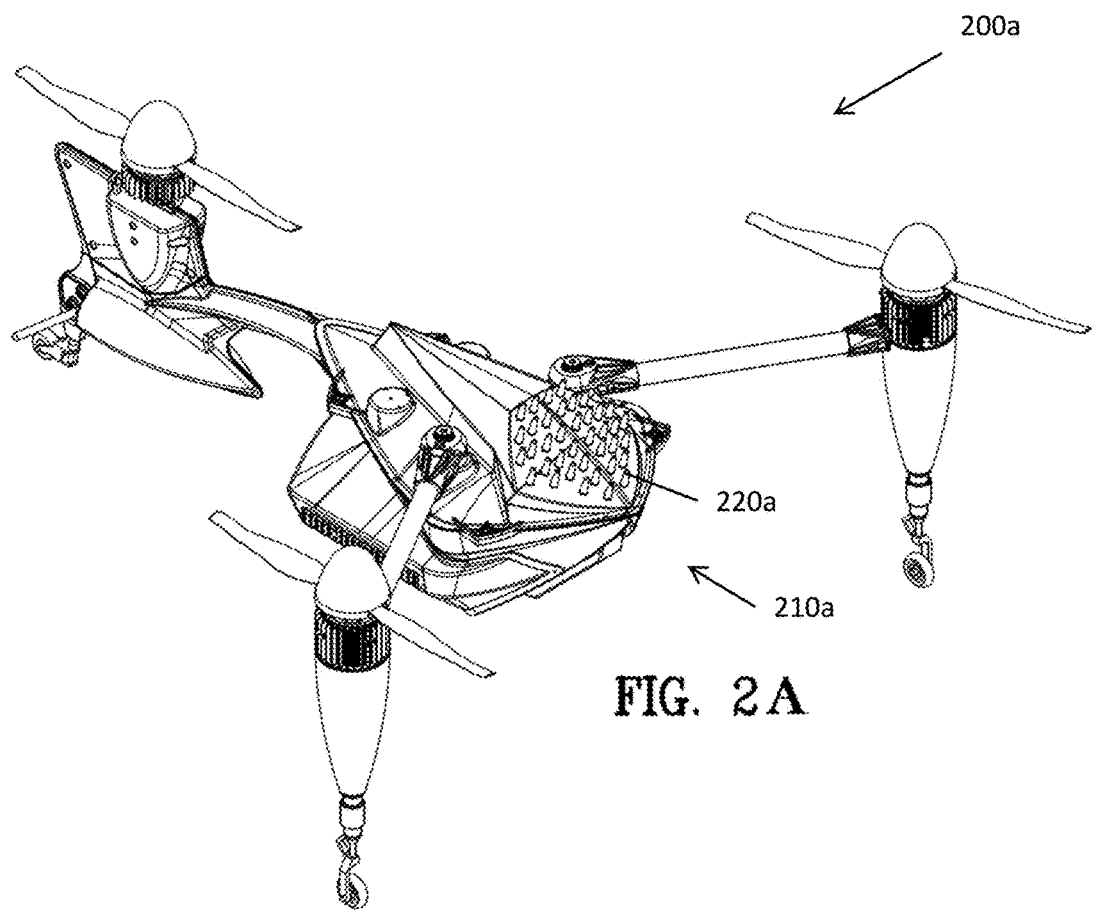
FIG. 2A is a perspective view of an alternative embodiment of an unmanned aerial vehicle 200a having a composite heat sink integral with the front fuselage.
Figure 2B:
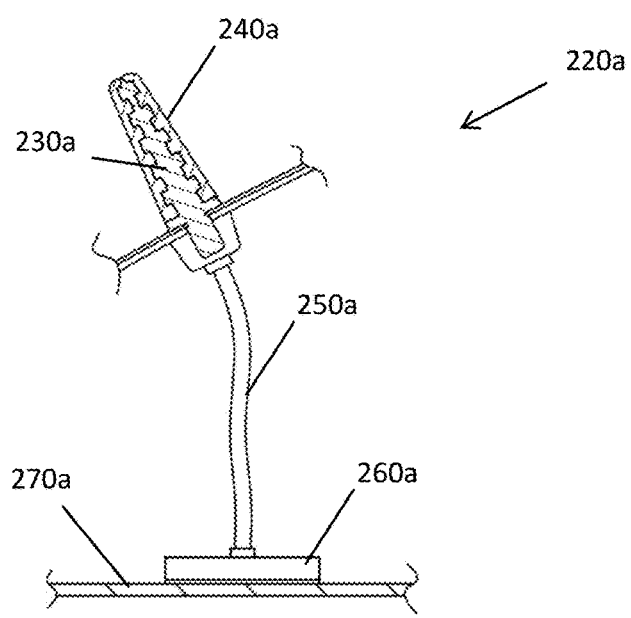
FIG. 2B is a cross-section of a portion of the unmanned aerial vehicle 200a of FIG. 2A.

FIG. 2A illustrates a perspective views of an alternative embodiment of an unmanned aerial vehicle 200a having a composite heat sink integral with a front fuselage 210a. In the illustrated embodiment, the front fuselage 210a includes a plurality of fuselage heat fins 220a. In the illustrated embodiment, the fuselage heat fins 220a are substantially cone shaped.

The plurality of fuselage heat fins 220a are thermally coupled to a motor or other heat source for dissipating heat generated therefrom. More specifically, as shown in the detailed cross-sectional view of FIG. 2B, the plurality of fuselage heat fins 220a are thermally coupled to a chassis plate 230a or other heat source for dissipating heat generated from the chassis plate 230a and out of the plurality of fuselage heat fins 220a. In the illustrated embodiment, the fuselage heat fin 220a includes a threaded metallic pin 230a that is encapsulated by a composite structure 240a. The threaded metallic pin 230a and the composite structure 240a are configured to transfer thermal energy from the base of the metallic pin 230a, through the upper portions of the metallic pin 230a, and then dissipate the thermal energy through the composite structure 240a. In one embodiment, the composite structure 240a incorporates crystalline carbon heat sink material for thermal management.

The base of the metallic pin 230a is connected to a conductive rope 250a that extends to a thermal slug 260a. The thermal slug 260a is coupled to a hot component such as the chassis plate 270a.

The plurality of fuselage heat fins 220a can be installed even on the fly utilizing metallics and pitch fiber. The pitch fiber is available with thermal conductivities ranging from 200 to 900 W/m·K. Performance depends largely on the selected fiber orientation and matrix. Through this, significant weight savings and increased thermal properties can be achieved.

The plurality of fuselage heat fins 220a includes the ability to physically test a custom heat sink without any significant upfront cost. Once the custom assembled heat sink performs as required, the plurality of fuselage heat fins 220a may be molded as a single piece, homogeneous product.

The plurality of fuselage heat fins 220a can be manufactured from any light weight material but is optimized for thermally conductive options such as: aluminum, beralcast or beryllium aluminum alloys, magnesium, pitch fiber, copper, or graphite. Alternatively, the plurality of fuselage heat fins 220a may include thermally conductive injection molded materials such as Cool Polymer's thermally conductive thermoplastics.

FIG. 2C illustrates a perspective views of an alternative embodiment of an unmanned aerial vehicle 200c having a composite heat sink integral with a front fuselage 210c. In the illustrated embodiment, the front fuselage 210c includes a plurality of fuselage heat fins 220c. In the illustrated embodiment, the fuselage heat fins 220c are oblong shaped. Aside from the difference in shape, the oblong fuselage heat fins 220c are substantially the same as the cone-shaped fuselage heat fins 220a.

FIG. 2D illustrates a perspective view of an alternative embodiment of an unmanned aerial vehicle 200d having a composite heat sink integral with a front fuselage 210d. In the illustrated embodiment, the front fuselage 210d includes a fuselage cover 220d.

FIG. 2E illustrates one embodiment of the fuselage cover $220d_1$. In this embodiment, the fuselage cover $220d_1$ includes a plurality of elongated fins 230e. The fuselage grating $220d_1$ may be constructed of the same materials and connected to components in the same manner described above with reference to the cone-shaped fuselage heat fins 220a described above with reference to FIGS. 2A and 2B.

FIG. 2F illustrates an alternative embodiment of the fuselage cover $220d_2$. In this embodiment, the fuselage cover $220d_2$ includes a plurality of peaked surfaces 230f. The fuselage cover $220d_2$ may be constructed of the same materials and connected to components in the same manner described above with reference to the cone-shaped fuselage heat fins 220a described above with reference to FIGS. 2A and 2B.

Figure 2:
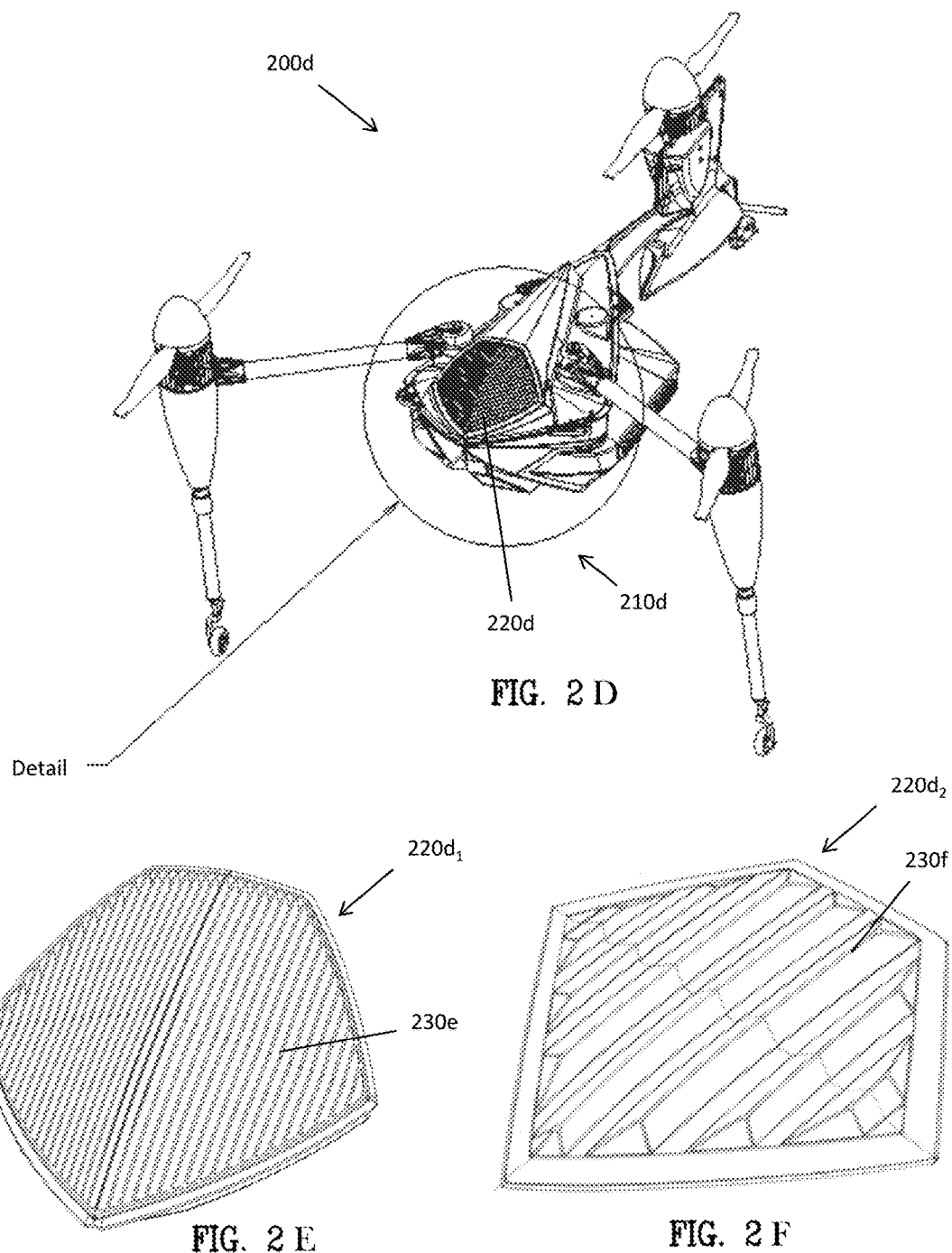
FIG. 2C is a perspective view of another alternative embodiment of an unmanned aerial vehicle 200c having a composite heat sink integral with the front fuselage.
FIG. 2D is a perspective view of yet another alternative embodiment of an unmanned aerial vehicle 200d having a composite heat sink integral with the front fuselage.
FIGS. 2E and 2F are detail views of alternative embodiments of the heat sink of FIG. 2D.
FIG. 2G illustrates one embodiment of layers that may be employed in an unmanned aerial vehicle.
FIG. 2H illustrates a perspective cutaway view of another alternative embodiment of an unmanned aerial vehicle.
Figure 2G:
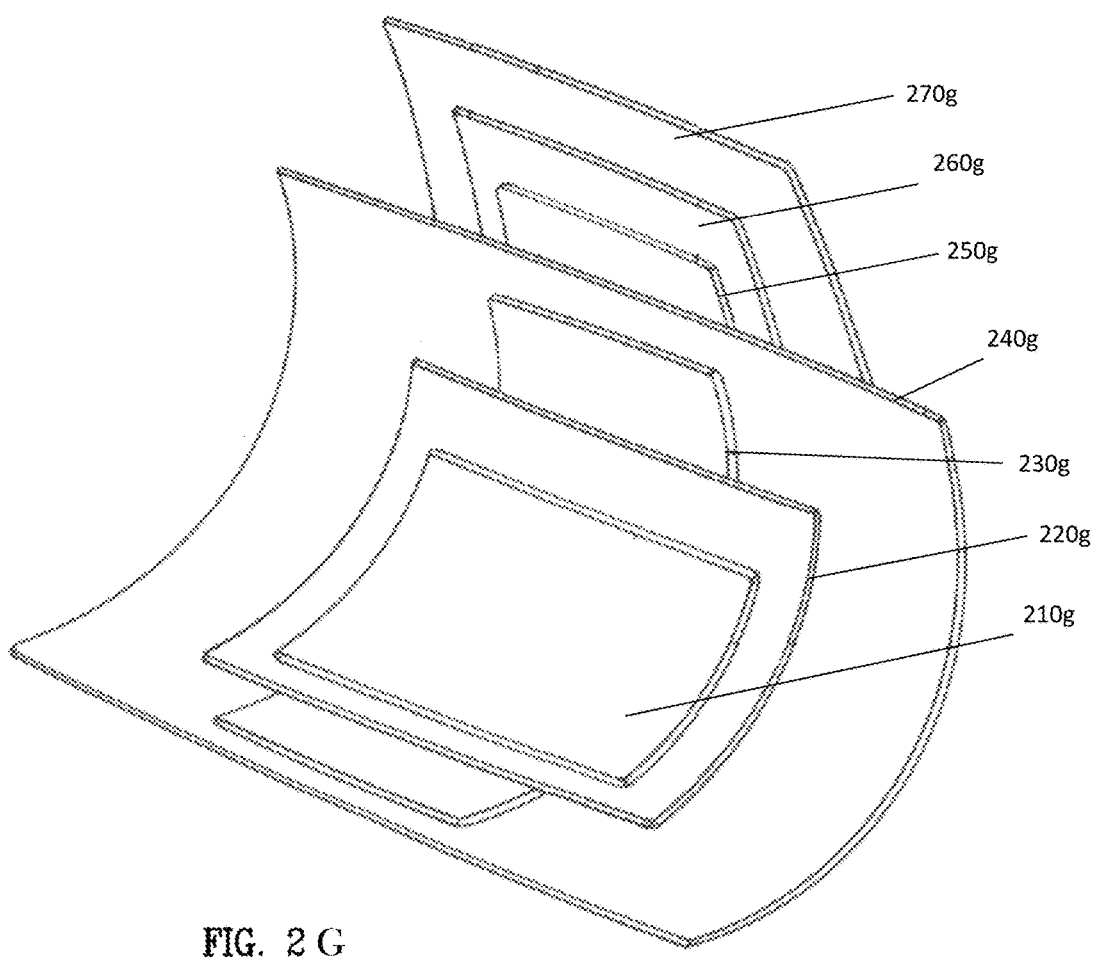
Figure 2:
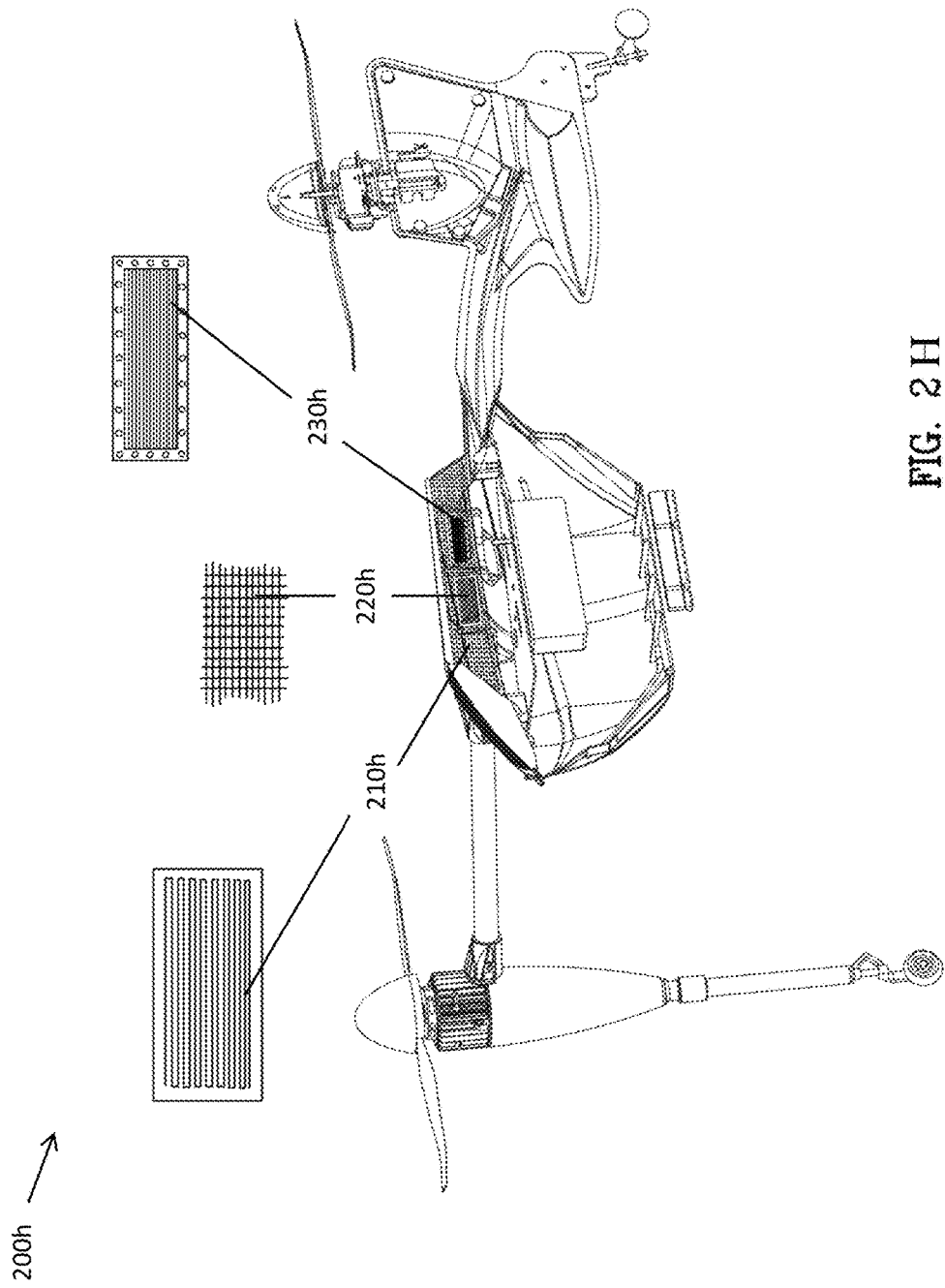

FIG. 2G illustrates one embodiment of layers that may be employed in an unmanned aerial vehicle. In addition to, or instead of the processes disclosed above, it is possible to co-laminate or insitu-laminate several different variables into dialectrically conductive materials to advance the possible performance capabilities of a UAV. In the illustrated embodiment, the layers include a copper sheet 210g, a carbon fiber sheet 220g, kapton tape 230g, electrical trace 240g, a second layer of kapton tape 250g, a heater blanket 260g, and a second layer of carbon fiber 270g. In alternative embodiments, the components that are molded into the interior structure include, without limitation: heater blankets with various ranges of sizes and intensity for cold weather environments, various metallic for EMI/RFI shielding, and conductive electrical traces.

FIG. 2H illustrates a perspective cutaway view of another alternative embodiment of a UAV 200h. The UAV 200h includes several of the layers described above with reference to FIG. 2G. In the illustrated embodiment, the UAV 200h includes heater blankets 210h, co-laminated metallics 220h, and conductive traces 230h. In alternative embodiments, any of the other layers described above may be employed.

While FIGS. 1 and 2A-H show and discuss specific portions of a UAV that are constructed of thermally conductive material, it should be understood that other portions may also be constructed of such material.

As discussed above, some embodiments of a thermally conductive UAV include portions constructed of a thermally conductive rope. Details of several types of thermally conductive rope are described in U.S. Provisional Patent Application No. 62/240,460, filed on Oct. 12, 2015 by Rapid Heat Sinks, LLC, the disclosure of which is incorporated by reference herein in its entirety. For convenience, certain details and images from that application are presented herewith. However, the reader should refer to the original application for a more fulsome description.

FIGS. 3A-3E illustrate cross-sections of exemplary embodiments of crystalline carbon fiber rope 300 that may be formed by one of the processes discussed above with reference to FIGS. 1 and 2. While various embodiments are discussed, it should be understood that the materials listed are not exhaustive.

Figure 3A:
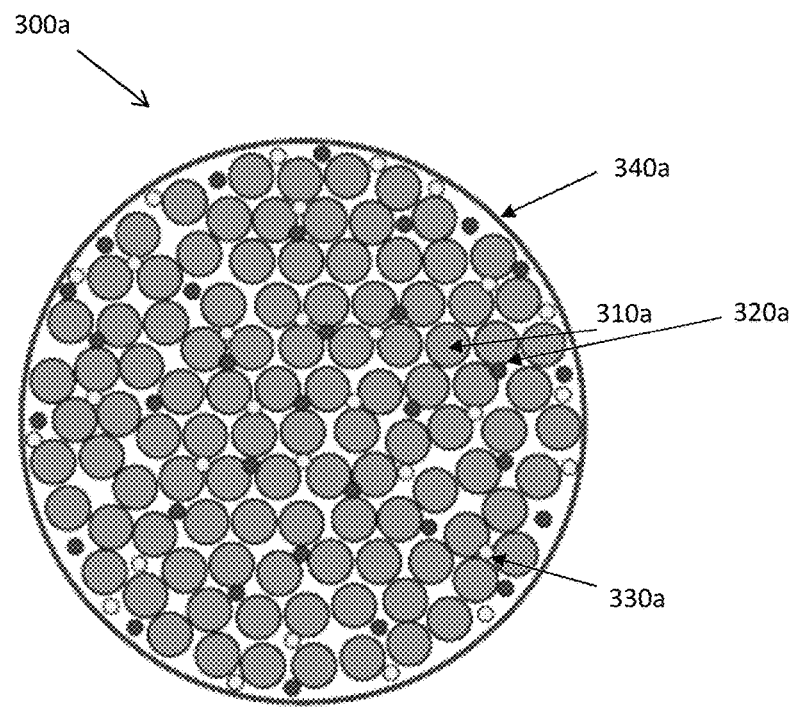
FIGS. 3A-3E illustrate cross-sections of exemplary embodiments of crystalline carbon rope.

FIG. 3A illustrates a cross-section of one embodiment of a crystalline carbon fiber rope 300a having a plurality of crystalline carbon fibers 310a. In one embodiment, the crystalline carbon fibers 310a are pitch fibers. Other exemplary crystalline carbon fibers include, without limitation: graphite, buckypaper, carbon nano materials, graphene, and PEMTEX. However, it should be understood that any type of crystalline carbon fiber may be employed.

The crystalline carbon fiber rope 300a also includes a plurality of additional fibers 320a. The additional fibers 320a may be crystalline fiber, semi-crystalline fiber, synthetic fiber, or hybrid fiber. Exemplary additional fibers include, without limitation: polyacrylonitrile (PAN) fiber, aramid fibers (such as Kevlar), thermoplastic, and boron nitride (BN). However, it should be understood that any type of fiber may be employed.

In the illustrated embodiment, the additional fibers 320a have a substantially smaller diameter than the crystalline carbon fibers 310a. In one example, the crystalline carbon fibers 310a are provided in a 6K tow and the additional fibers 320a are provided in a 1K tow. In another example, the crystalline carbon fibers 310a are provided in a 12K tow and the additional fibers 320a are provided in a 3K tow. Other examples should be apparent to one of ordinary skill in the art. The crystalline carbon fibers 310a may be provided in 1K to 12K tow and the additional fibers 320a may be provided in 3K to 50K tow.

The additional fibers 320a are evenly distributed throughout the rope 300a. This may be achieved by first braiding the tows of crystalline carbon fibers 310a and the tows of additional fibers 320a into a plurality of ropes, and then braiding the plurality of ropes into a single, larger rope 300a. Alternatively, the distribution may be achieved by simultaneously braiding all of the tows of crystalline carbon fibers 310a and additional fibers 320a into a single rope 300a. In another alternative embodiment (not shown), the additional fibers 320a are randomly distributed throughout the rope 300a.

The crystalline carbon fiber rope 300a also includes a plurality of second additional fibers 330a. In one embodiment, the second additional fibers 330a are thermoplastic fibers. Exemplary thermoplastics include, without limitation: acrylic, ABS, nylon, polyamide (PA), polyactic acid (PLA), polybenzimidazole (PBI), polycarbonate (PC), polyether sulfone (PES), PEEK, polyetherimide (PEI), polyethylene, polyphenylene oxide (PPO), polyphenylene sulfide (PPS), polypropylene (PP), polystyrene, polytetrafluoroethylene (PTFE), and Polyvinyl chloride (PVC). In the illustrated embodiment, the second additional fibers 330a have substantially the same diameter as the additional fibers 320a. In an alternative embodiment (not shown), the additional fibers and second additional fibers have different diameters.

The second additional fibers 330a are randomly distributed throughout the rope 300a. This may be achieved by first braiding the tows of crystalline carbon fibers 310a and the tows of additional fibers 320a into a plurality of ropes, and then braiding the plurality of ropes with tows of the second additional fibers 330a into a single, larger rope 300a. Alternatively, the distribution may be achieved by simultaneously braiding all of the tows of crystalline carbon fibers 310a, additional fibers 320a, and second additional fibers 330a into a single rope 300a. In another alternative embodiment (not shown), the second additional fibers 320a are evenly distributed throughout the rope 300a.

The rope 300a also includes a sheath 340a. In one embodiment, the sheath 340a is constructed of thermoplastic, such as the thermoplastics listed above with reference to the second additional fibers 330a. In alternative embodiments, the sheath 340a may be constructed of PAN fibers, aramid fibers (such as Kevlar), or BN. The sheath 340a may be wound about the rope or woven or braided about the rope. Alternatively, the sheath 340a may encase the rope by a shrink wrapping process.

Figure 3B:
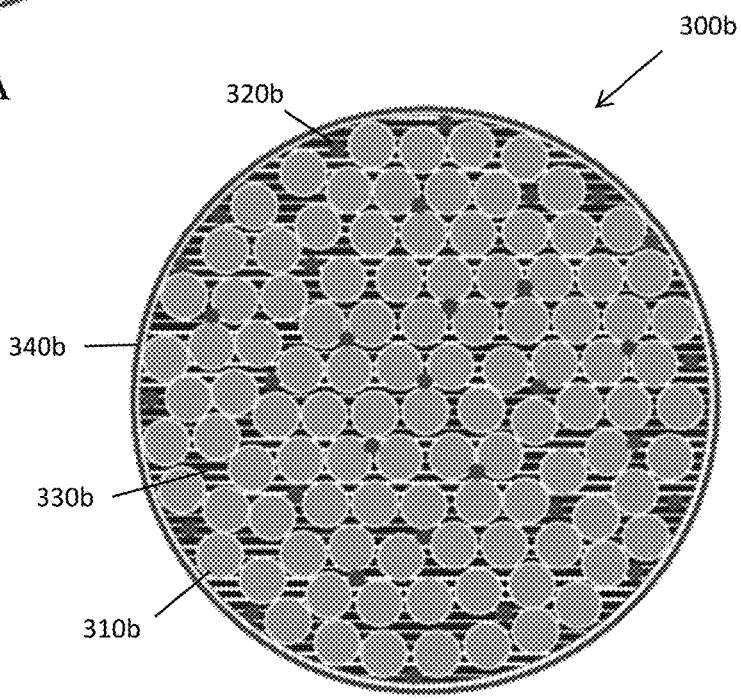

FIG. 3B illustrates a cross-section of an alternative embodiment of a crystalline carbon fiber rope 300b having a plurality of crystalline carbon fibers 310b. In one embodiment, the crystalline carbon fibers 310b are pitch fibers. In alternative embodiments, other crystalline carbon fibers may be employed, such as the alternatives listed above with reference to the crystalline carbon fibers 310a of FIG. 3A. The crystalline carbon fibers 310b may include multiple types of crystalline carbon fibers.

The crystalline carbon fiber rope 300b also includes a plurality of additional fibers 320b. In one embodiment, the additional fibers 320b are PAN fibers. In alternative embodiments, the additional fibers 320b are aramid fibers, thermoplastic fibers, or BN fibers.

In the illustrated embodiment, the additional fibers 320b have a substantially smaller diameter than the crystalline carbon fibers 310b. In one example, the crystalline carbon fibers 310b are provided in a 6K tow and the additional fibers 320b are provided in a 1K tow. In another example, the crystalline carbon fibers 310b are provided in a 12K tow and the additional fibers 320b are provided in a 3K tow. Other examples should be apparent to one of ordinary skill in the art. The crystalline carbon fibers 310b may be provided in 1K to 12K tow and the additional fibers 320b may be provided in 3K to 50K tow.

The additional fibers 320b are evenly distributed throughout the rope 300b. This may be achieved by first braiding the tows of crystalline carbon fibers 310b and the tows of additional fibers 320b into a plurality of ropes, and then braiding the plurality of ropes into a single, larger rope 300b. Alternatively, the distribution may be achieved by simultaneously braiding all of the tows of crystalline carbon fibers 310b and additional fibers 320b into a single rope 300b. In another alternative embodiment (not shown), the additional fibers 320b are randomly distributed throughout the rope 300b.

The crystalline carbon fiber rope 300b also includes a matrix 330b. In one embodiment, the matrix 330b is a resin. Alternatively, the matrix 330b is any thermoset. Exemplary thermosets include, without limitation: polyester resins, epoxy resins, melamine resins, polyimides, urea-formaldehyde, duroplast, vinyl ester, and bakelite. The matrix 330b may be formed by immersing the rope 300b in a resin bath, spraying the rope 300b, or infusing the tows or yarns prior to forming the rope. Alternatively, the matrix 330b may be formed during a coating process. In an alternative embodiment, thermoplastic or thermoset materials may be applied in a rolled sheet form.

The rope 300b also includes a sheath 340b. In one embodiment, the sheath 340b is constructed of thermoplastic, such as the thermoplastics listed above with reference to the second additional fibers 330a of FIG. 3A. In alternative embodiments, the sheath 340b may be constructed of PAN fibers, aramid fibers, or BN. The sheath 340b may be wound about the rope or woven or braided about the rope. Alternatively, the sheath 340b may encase the rope by a shrink wrapping process.

Figure 3C:
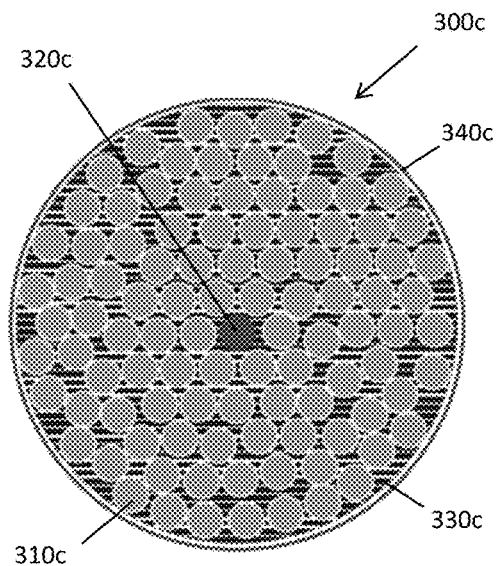

FIG. 3C illustrates a cross-section of another alternative embodiment of a crystalline carbon fiber rope 300c having a plurality of crystalline carbon fibers 310c. In one embodiment, the crystalline carbon fibers 310c are pitch fibers. In alternative embodiments, other crystalline carbon fibers may be employed, such as the alternatives listed above with reference to the crystalline carbon fibers 310a of FIG. 3A. The crystalline carbon fibers 310c may include multiple types of crystalline carbon fibers.

The crystalline carbon fiber rope 300c also includes a core 320c that is a tow of an additional fiber. In one embodiment, the core 320c is a tow of PAN fiber. In alternative embodiments, the core 320c is a tow of aramid fiber, thermoplastic fiber, or BN fiber.

In the illustrated embodiment, the core 320c has substantially the same diameter as the tows of crystalline carbon fibers 310c. In one example, the crystalline carbon fibers 310c and the core 320c are provided in a 6K tow. In another example, the crystalline carbon fibers 310c and the core 320c are provided in a 12K tow. Other examples should be apparent to one of ordinary skill in the art. The crystalline carbon fibers 310c and the core 320c may be provided in 1K to 50K tow.

The crystalline carbon fiber rope 300c also includes a matrix 330c. In one embodiment, the matrix 330c is a resin. Alternatively, the matrix 330c is any thermoset, such as the thermosets listed above with reference to the matrix 330b of FIG. 3B. The matrix 330c may be formed by immersing the rope 300c in a resin bath, by spraying the rope 300c, or by infusing the tows or yarns prior to forming the rope. Alternatively, the matrix 330b may be formed during a coating process. In an alternative embodiment, thermoplastic or thermoset materials may be applied in a rolled sheet form.

The rope 300c also includes a sheath 340c. In one embodiment, the sheath 340c is constructed of thermoplastic, such as the thermoplastics listed above with reference to the second additional fibers 330a of FIG. 3A. In alternative embodiments, the sheath 340c may be constructed of PAN fibers, aramid fibers, or BN. The sheath 340c may be wound about the rope or woven or braided about the rope. Alternatively, the sheath 340c may encase the rope by a shrink wrapping process.

Figure 3D:
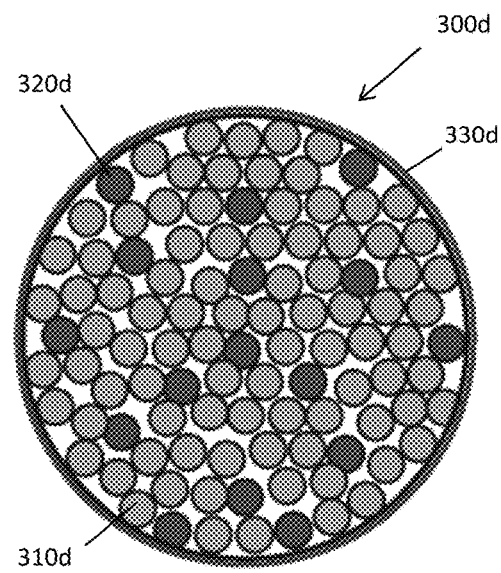

FIG. 3D illustrates a cross-section of still another alternative embodiment of a crystalline carbon fiber rope 300d having a plurality of crystalline carbon fibers 310d. In one embodiment, the crystalline carbon fibers 310d are pitch fibers. In alternative embodiments, other crystalline carbon fibers may be employed, such as the alternatives listed above with reference to the crystalline carbon fibers 310a of FIG. 3A. The crystalline carbon fibers 310d may include multiple types of crystalline carbon fibers.

The crystalline carbon fiber rope 300d also includes a plurality of additional fibers 320d. In one embodiment, the additional fibers 320d are PAN fibers. In alternative embodiments, the additional fibers 320d are aramid fibers, thermoplastic fibers, or BN fibers.

In the illustrated embodiment, the additional fibers 320d have substantially the same diameter as the crystalline carbon fibers 310d. In one example, the crystalline carbon fibers 310d and the additional fibers 320d are provided in a 6K tow. In another example, the crystalline carbon fibers 310d and the additional fibers 320d are provided in a 12K tow. Other examples should be apparent to one of ordinary skill in the art. The crystalline carbon fibers 310d and the additional fibers 320d may be provided in 1K to 50K tow.

In the illustrated embodiment, each of the crystalline carbon fibers 310d and the additional fibers 320d are coated with a resin. The resin may be any thermoset, such as the thermosets listed above with reference to the matrix 330b of FIG. 3B. The resin coating may be formed by immersing each tow of crystalline carbon fiber 310d and additional fiber 320d in a resin bath, or by spraying each tow of crystalline carbon fiber 310d and additional fiber 320d. Alternatively, the coating may be formed by a quasi-isotropic process.

The rope 300d also includes a sheath 330d. In one embodiment, the sheath 330d is constructed of thermoplastic, such as the thermoplastics listed above with reference to the second additional fibers 330a of FIG. 3A. In alternative embodiments, the sheath 330d may be constructed of PAN fibers, aramid fibers, or BN.

The sheath 330d is coated with a resin. In the illustrated embodiment, the interior of the sheath 330d is coated with a resin. In an alternative embodiment (not shown), the exterior of the sheath 330d is coated with a resin. In another alternative embodiment (not shown), both the interior and the exterior of the sheath is coated with a resin. The resin may be any thermoset. The resin coating may be formed by immersing or spraying the sheath. Alternatively, the resin coating may be formed by a quasi-isotropic process.

The sheath 330d may be wound about the rope or woven or braided about the rope. Alternatively, the sheath 330d may encase the rope by a shrink wrapping process.

Figure 3E:
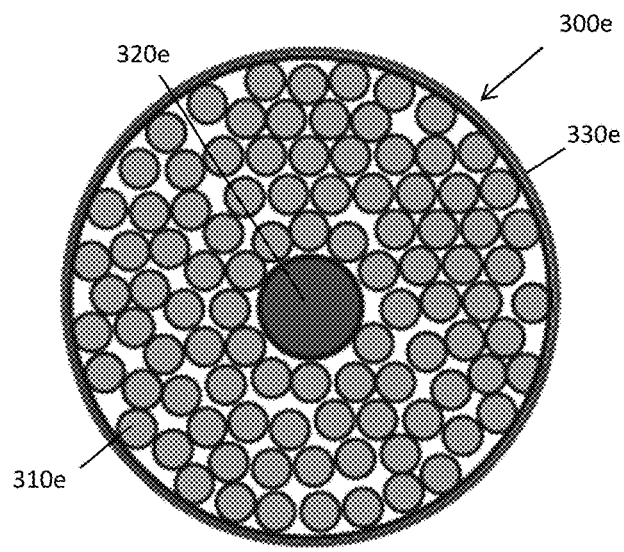

FIG. 3E illustrates a cross-section of yet another alternative embodiment of a crystalline carbon fiber rope 300e having a plurality of crystalline carbon fibers 310e. In one embodiment, the crystalline carbon fibers 310e are pitch fibers. In alternative embodiments, other crystalline carbon fibers may be employed, such as the alternatives listed above with reference to the crystalline carbon fibers 310a of FIG.

3A. The crystalline carbon fibers 310e may include multiple types of crystalline carbon fibers.

The crystalline carbon fiber rope 300e also includes a core that is a tow of an additional fiber 320e. In one embodiment, the additional fiber 320e is a PAN fiber. In alternative embodiments, the additional fiber 320e is an aramid fiber, thermoplastic fiber, or BN fiber.

In the illustrated embodiment, the additional fiber 320e has a substantially larger diameter than the crystalline carbon fibers 310e. In one example, the crystalline carbon fibers 310e are provided in a 1K tow and the additional fiber 320e is provided in a 6K tow. In another example, the crystalline carbon fibers 310e are provided in a 3K tow and the additional fiber 320e is provided in a 12K tow. Other examples should be apparent to one of ordinary skill in the art. The crystalline carbon fibers 310e may be provided in 3K to 50K tow and the additional fiber 320e may be provided in 1K to 12K tow.

In the illustrated embodiment, each of the crystalline carbon fibers 310e and the additional fibers 320e are coated with a resin. The resin may be any thermoset, such as the thermosets listed above with reference to the matrix 330b of FIG. 3B. The resin coating may be formed by immersing each tow of crystalline carbon fiber 310e and additional fiber 320e in a resin bath, or by spraying each tow of crystalline carbon fiber 310e and additional fiber 320e.

The rope 300e also includes a sheath 330e. In one embodiment, the sheath 330e is constructed of thermoplastic, such as the thermoplastics listed above with reference to the second additional fibers 330a of FIG. 3A. In alternative embodiments, the sheath 330e may be constructed of PAN fibers, aramid fibers, or BN.

The sheath 330e is coated with a resin. In the illustrated embodiment, the interior of the sheath 330e is coated with a resin. In an alternative embodiment (not shown), the exterior of the sheath 330e is coated with a resin. In another alternative embodiment (not shown), both the interior and the exterior of the sheath is coated with a resin. The resin may be any thermoset. The resin coating may be formed by immersing or spraying the sheath. Alternatively, the resin coating may be formed by a quasi-isotropic process.

The sheath 330e may be wound about the rope or woven or braided about the rope. Alternatively, the sheath 330e may encase the rope by a shrink wrapping process.

It should be understood that any of the above described components may be used in any of the other described embodiments. For example, the large, resin-coated core of additional fiber 320e from FIG. 3E may be used in any of the embodiments shown in FIGS. 3A-3D. As another example, the resin coated sheath 330d from FIG. 3D may be used in any of the embodiments shown in FIGS. 3A-3C. Other such combinations should be apparent to a person of ordinary skill in the art.

In an alternative embodiment (not shown), the crystalline carbon fibers may be co-mingled with any thermoplastic for later melt and impregnate applications. In other embodiments, BN filled ABS may be added to a thermoset vinyl ester matrix or composite compound and melded together. BN can be used as filler in any matrix contemplated. Additionally, any of the fibers may be coated with graphene oxide for enhanced mechanical strength, electrical conductivity, and thermal properties. Almost any thermoplastic or thermoset composite can be coated with graphene oxide for enhanced mechanical strength, electrical conductivity, and thermal properties.

In any of the embodiments described above with reference to FIGS. 3A-3E, metallic yarn may also be co-mingled with the other fibers in the rope. Exemplary metals include, without limitation: aluminum (including Al 1145, Al 3003, and Al 1100), brass (including brass 260, brass 70-30, brass 80-20, and brass 85-15), bronze (including bronze 90), cadmium, copper, gold, hastiloy (including hastiloy x), haynes (including haynes 214), inconell (including inconell 600), iron, lead, magnesium, molybdenum, nickel (including Ni 201 and Ni 899L), niobium, palladium, platinum, platinum clad niobium, silver, steel (including SS 304L, SS 316L, SS 444, and steel 1008), tantalum, titanium, zinc (including zinc 500), and zirconium.

Additionally, in any of the embodiments described above with reference to FIGS. 3A-3E, the yarns or tows may be combined with carbon nano-tubes or carbon nano fiber to improve thermal interfacing. Additionally, the tows or yarns may be highly graphitized or combined with other pyrolytic graphite materials to either improve costs or improve thermal interfacing.

While FIGS. 3A-3E show ropes having a generally circular cross-section, in alternative embodiments (not shown), the rope may have a triangular, square, rectangular, or quadrilateral cross-section. In other alternative embodiments (not shown), the rope may have a cross-section of any geometric shape.

Figure 4A:
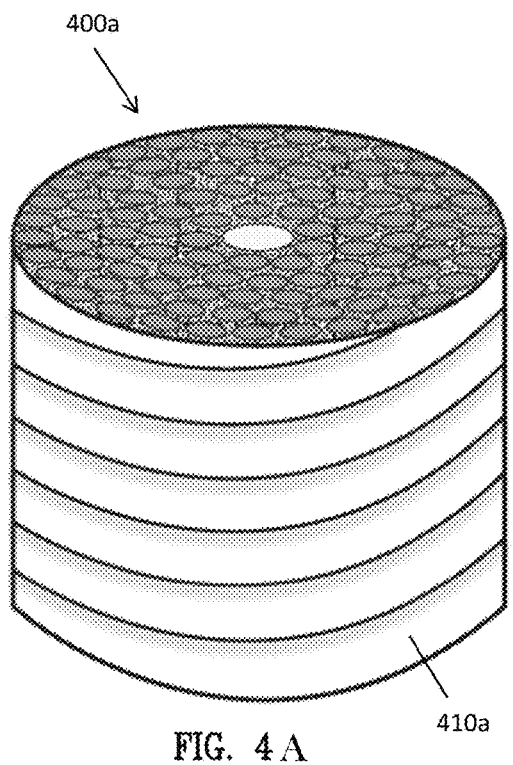
FIGS. 4A-4C illustrate perspective views of exemplary embodiments of crystalline carbon rope segments.
Figure 4B:
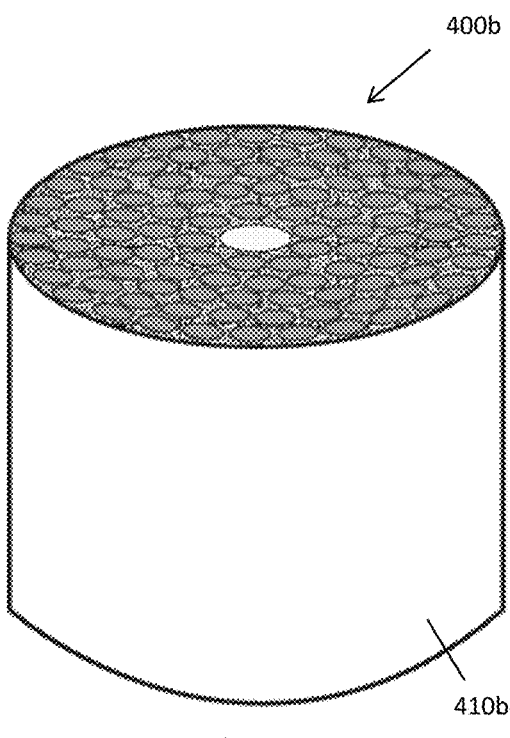
Figure 4C:
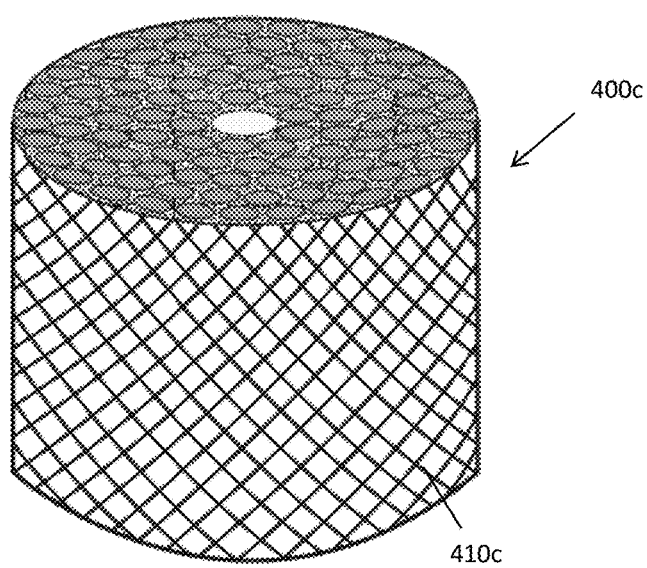

After a crystalline carbon fiber rope has been formed, it may be cut into a plurality of crystalline carbon fiber rope segments. FIGS. 4A-4C illustrate perspective views of exemplary embodiments of crystalline carbon fiber rope segments 400. The crystalline carbon fiber rope may have any of the constructions described above in relation to FIGS. 3A-3E. In one embodiment, the crystalline carbon fiber rope is cut into 1 inch (2.5 cm) segments. In alternative embodiments, the crystalline carbon fiber rope may be cut into 0.039 inch to 5 inch (0.010 to 13 cm) segments. It should be understood that the rope segments may be cut to any desirable length.

In FIG. 4A, the crystalline carbon fiber rope segment 400a is covered by a wound filament 410a. In FIG. 4B, the crystalline carbon fiber rope segment 400b is covered by a solid sheath 410b. In FIG. 4C, the crystalline carbon fiber rope segment 400c is covered by a braided sheathing 410c.

Figure 5E:
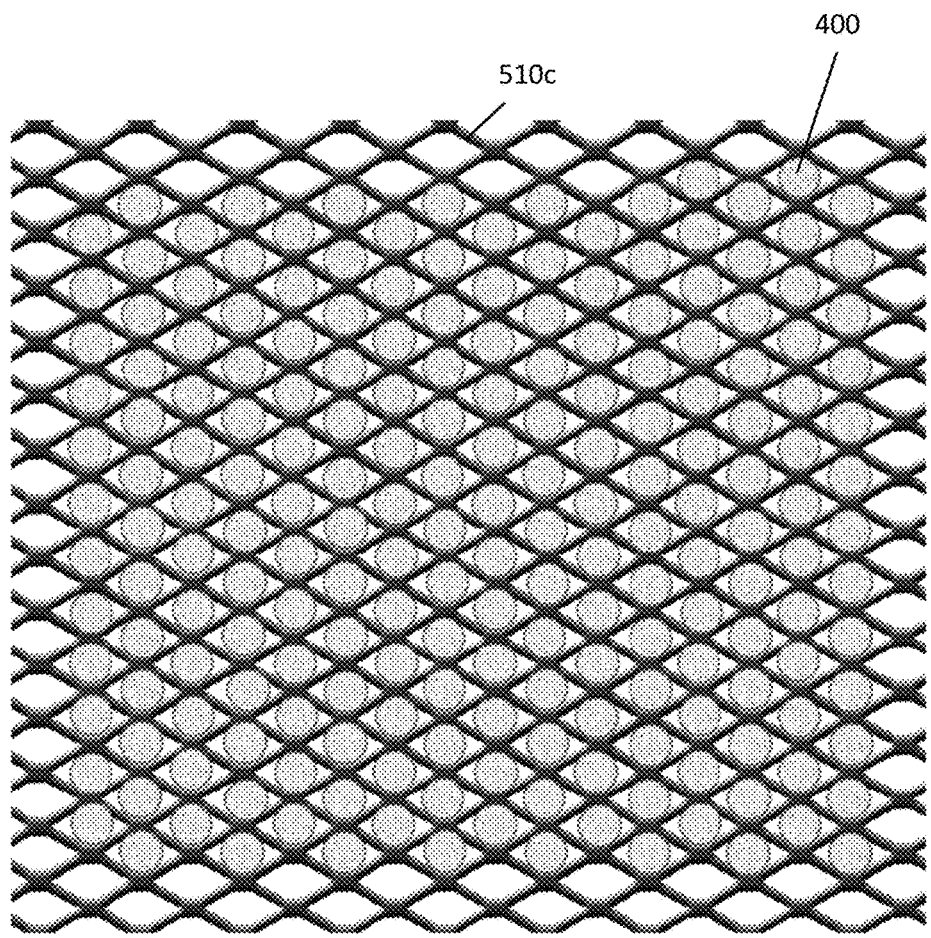
FIGS. 5A-5N are schematic drawings illustrating various views of crystalline carbon rope segments in a mold 500 and webbing for holding the segments in place.
Figure 5F:
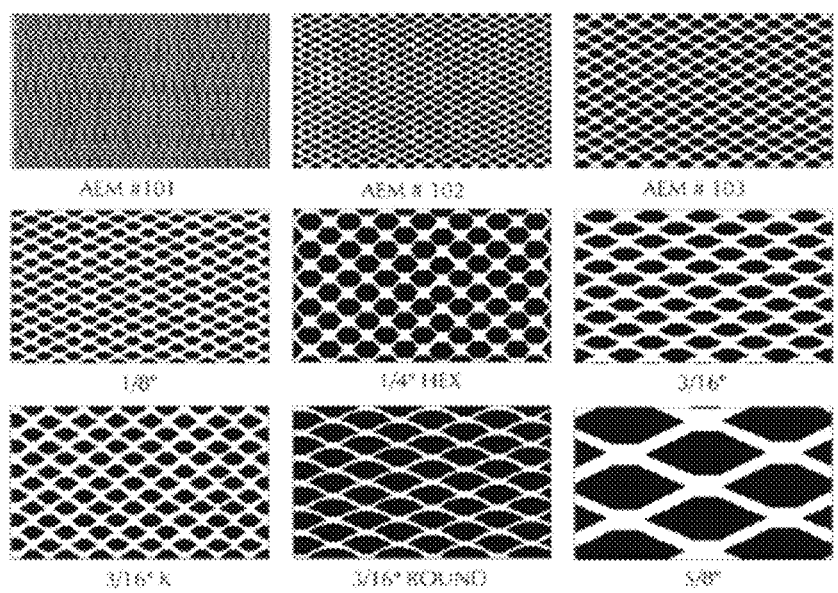
Figure 5G:
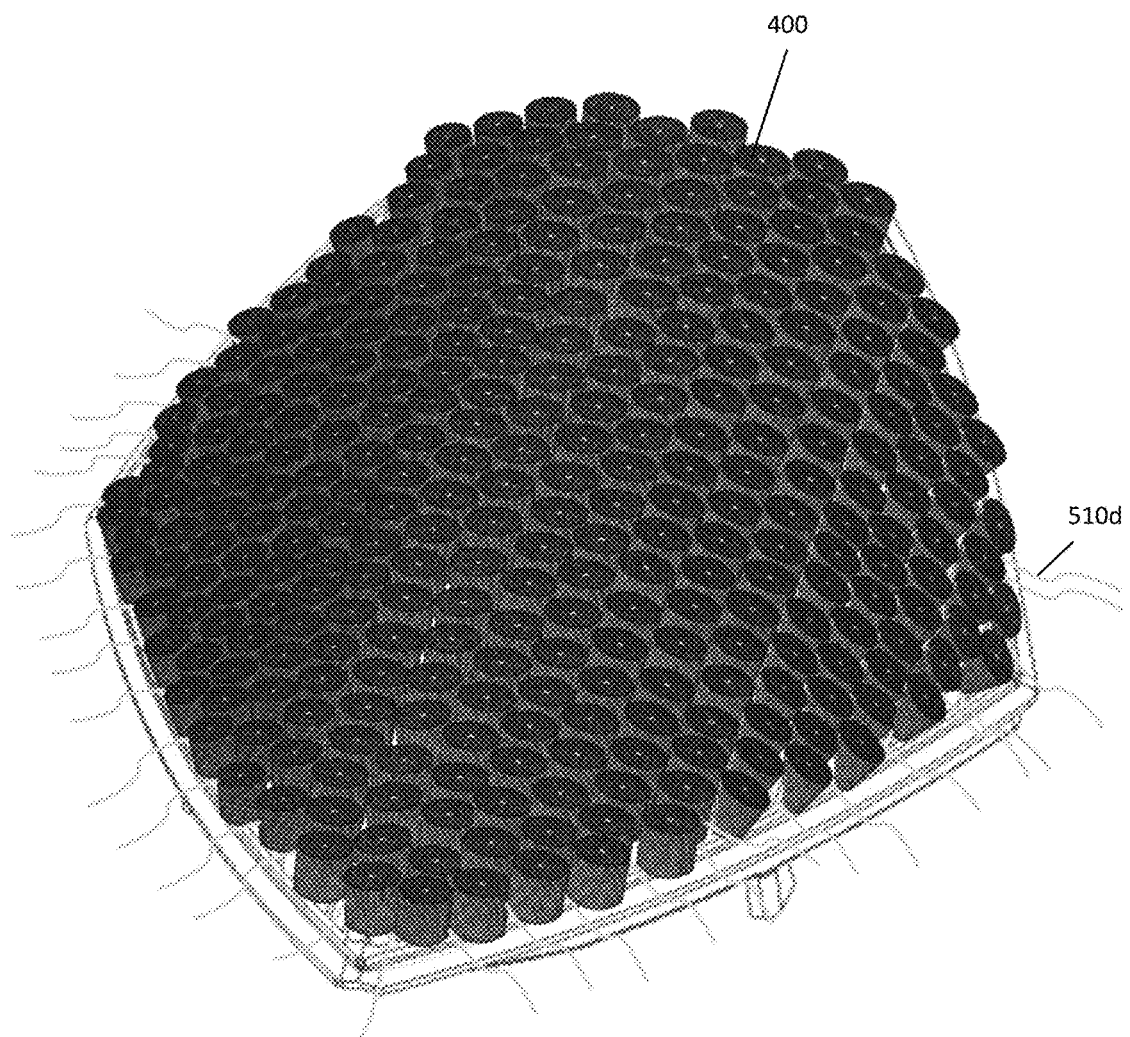
Figure 5H:
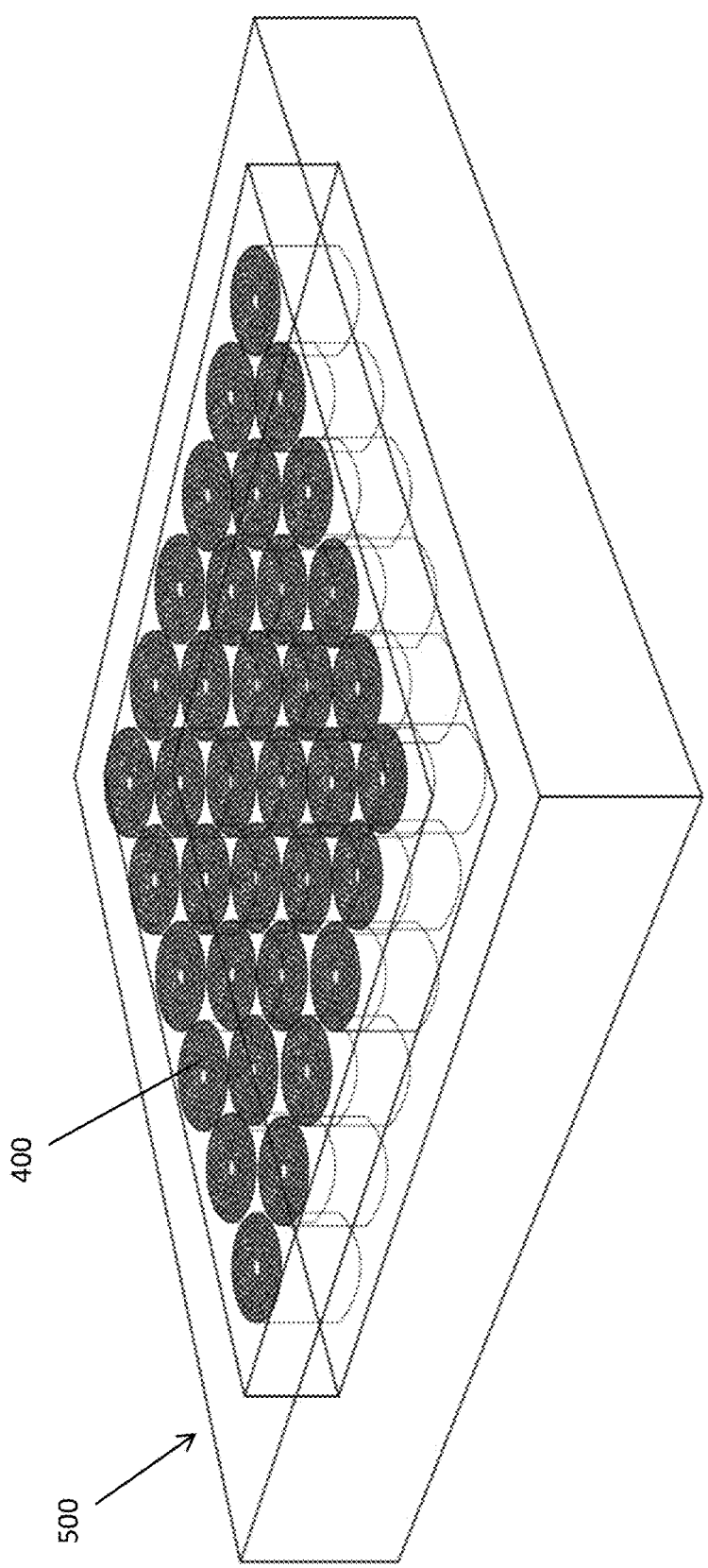
Figure 5J:
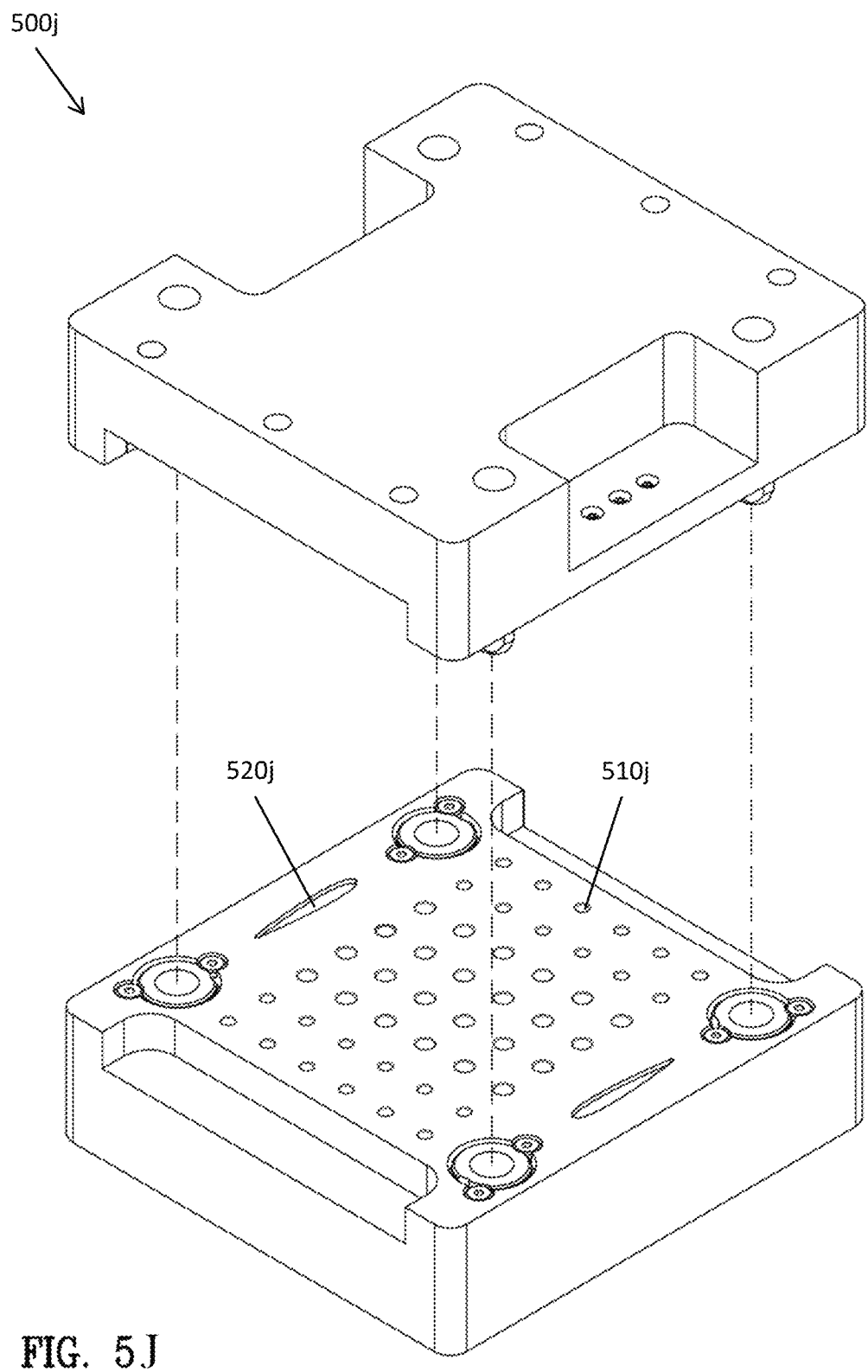
Figure 5:
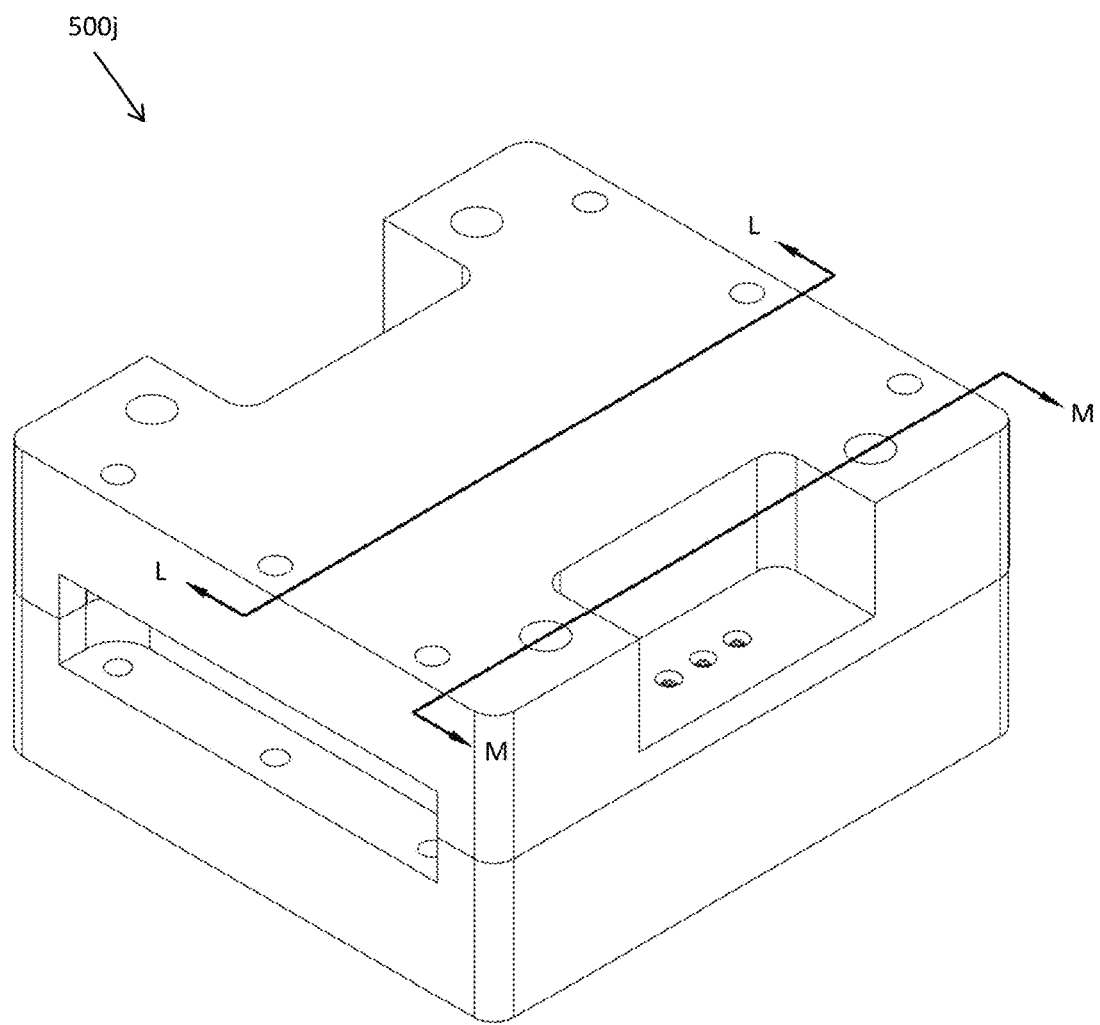
Figure 5:
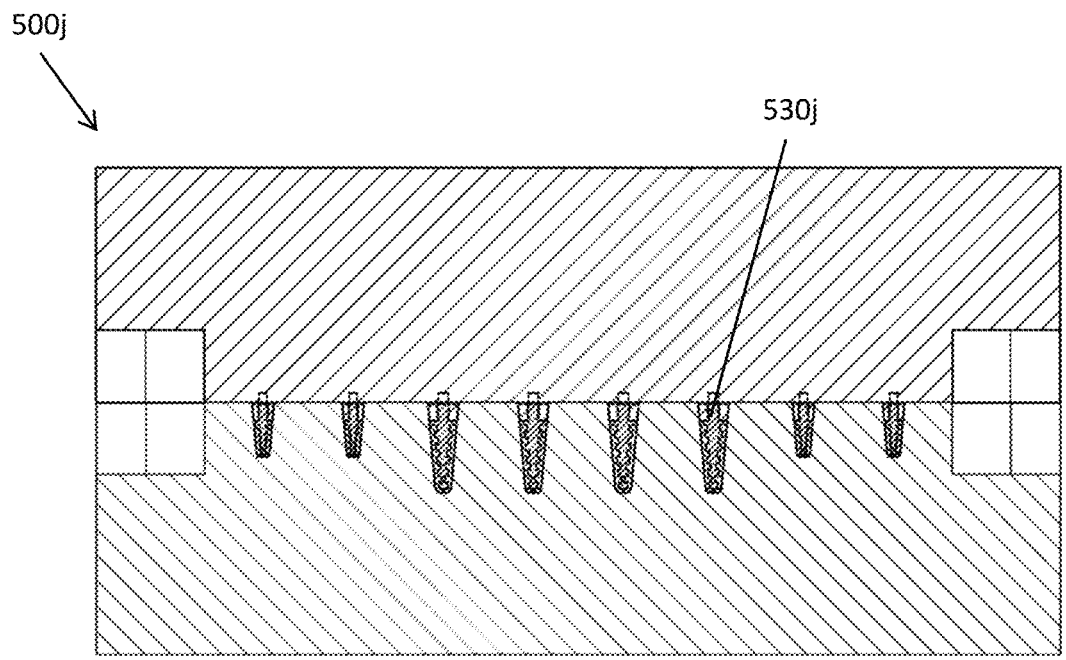
Figure 5:
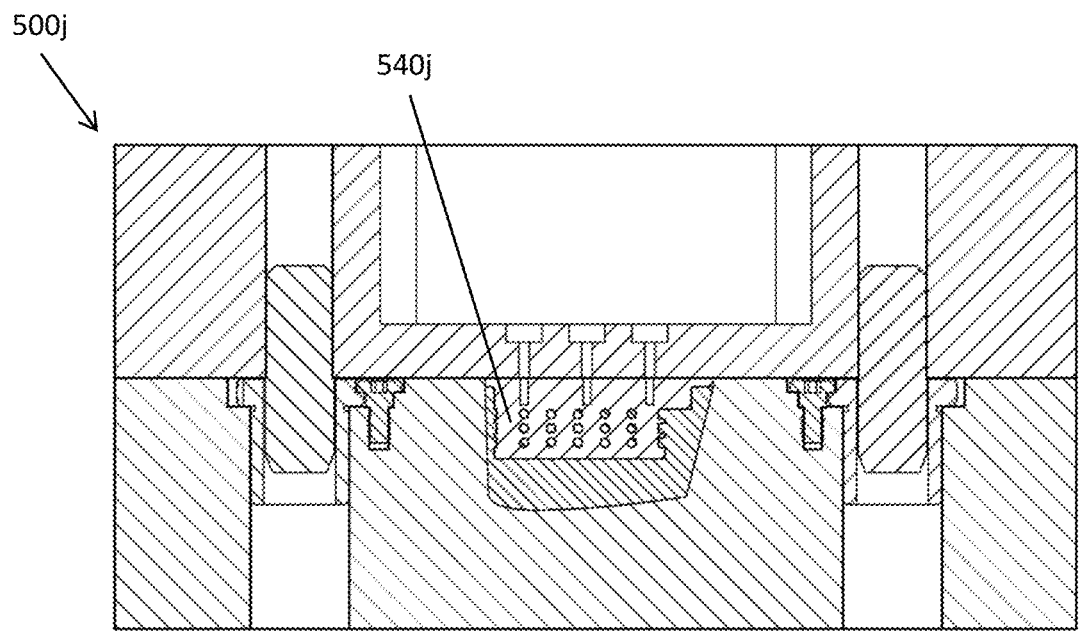
Figure 5N:
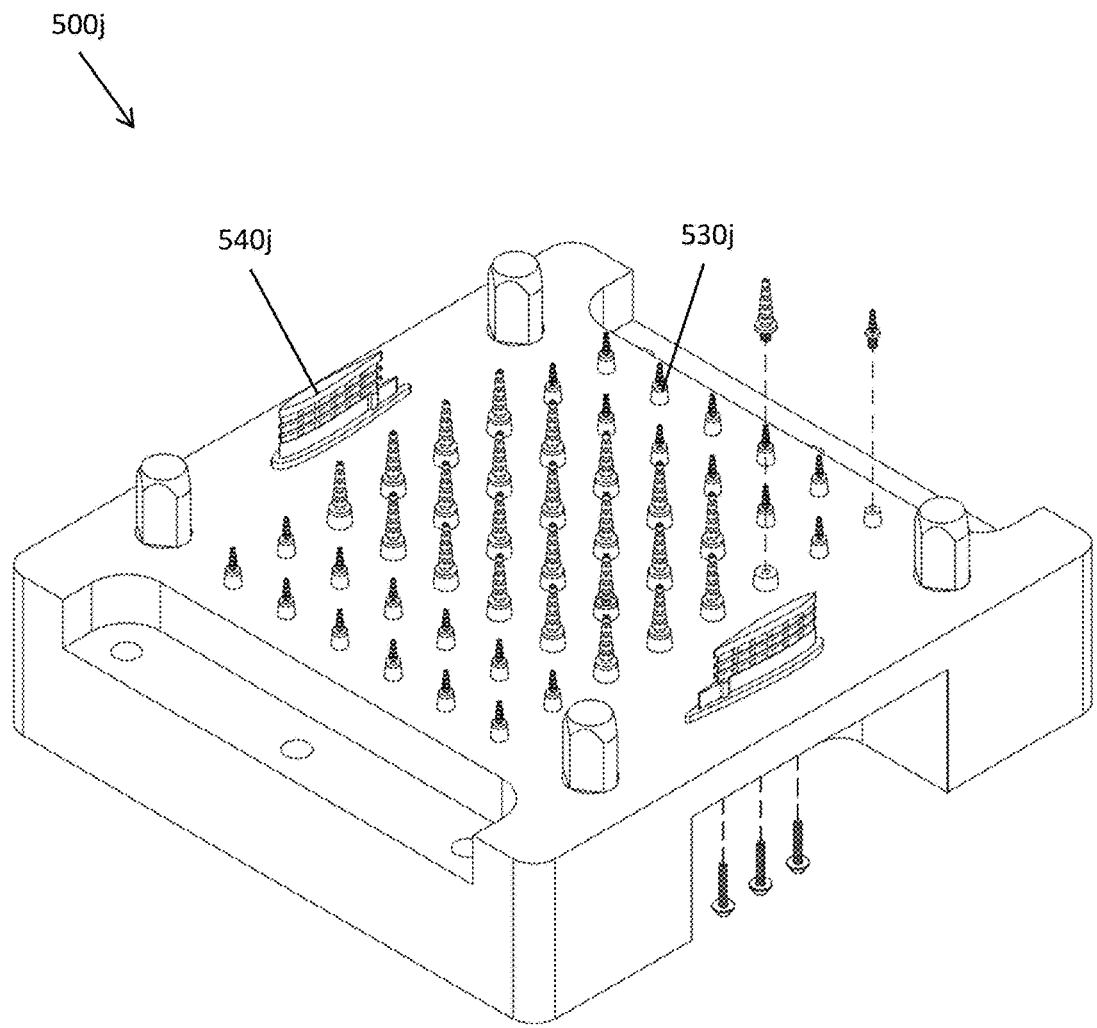

FIGS. 5A-5N are schematic drawings illustrating various embodiments of crystalline carbon fiber rope segments 400 in a mold 500. As shown in FIG. 5A, the crystalline carbon fiber rope segments 400 are placed in a cavity of the mold 500 such that the fibers extend in substantially the same direction, and each segment 400 contacts at least one adjacent segment. While the illustrated mold 500 has a cavity substantially defined by five surfaces, it should be understood that the cavity may have any number of surfaces. In the illustrated embodiment, the mold 500 is a compression mold. In an alternative embodiment (not shown), the mold may be an injection mold.

As shown in FIGS. 5B-5G, to aid in the placement of the crystalline carbon fiber rope segments 400, a net or webbing 510 may be employed. FIG. 5B illustrates a top view of a webbing 510a formed by single filaments of fiber that are woven together. FIG. 5C illustrates a close-up perspective view of the webbing 510a. The webbing may be formed of nylon, ABS, aramid fiber, carbon, spectra fiber, dyneema, or basalt fiber. However, it should be understood that any material may be employed.

FIG. 5D illustrates a top view of a webbing 510b formed by braided or twisted filaments that are then woven together. The filaments may be constructed of the same material described above for webbing 510a. In an alternative embodiment (not shown), the webbing may be formed of a rope of filaments.

While FIGS. 5B-5D illustrate simple webbings having square openings, it should be understood that more complex webbings may be employed. FIG. 5E illustrates a top view of one such webbing 510c, which has diamond-shaped openings. The webbing 510c may be formed by a molding process or an additive manufacturing process such as 3D printing. The webbing 510c may be formed of the same materials discussed above for webbing 510a.

FIG. 5F illustrates top views of several other possible webbing formations. It should be understood that these examples are not limiting, but are merely provided for additional context.

FIG. 5G illustrates a perspective view of a plurality of crystalline carbon fiber rope segments 400 that are held in a desired orientation by a webbing 510d. In the illustrated embodiment, the webbing 510d holds the crystalline carbon fiber rope segments 400 in the shape of a fuselage cover, such as the fuselage covers 220d illustrated in FIGS. 2D-2F. The crystalline carbon fiber rope segments 400 and webbing 510d may then be molded into the shape of the fuselage cover.

In any of the above-described embodiments, it is envisioned that the webbing 510 may be provided on a roll or in rectangular sheets. The webbing may then be cut to shape to fit in the mold. Alternatively, the webbing may be manufactured to fit the mold, thereby reducing waste.

In certain instances, it may be desirable to employ multiple sheets of webbing, stacked on top of each other. The multiple sheets of webbing may aid in keeping the crystalline carbon fiber rope segments in a desired position.

In one embodiment, the webbing is placed in the mold before the crystalline carbon fiber rope segments are inserted. In an alternative embodiment, the crystalline carbon fiber rope segments are first inserted into webbing that is in the desired shape. The webbing and crystalline carbon fiber rope segments are then placed in the mold together at the same time. This method may help increase throughput when multiple components are being molded.

In one embodiment, the webbing is merely used to initially align the crystalline carbon fiber rope segments, and the webbing is removed before the molding process begins. Alternatively, the webbing can remain in place during the molding process and the material of the webbing becomes incorporated into the final molded product.

After the crystalline carbon fiber rope segments 400 are placed in the mold 500, a surface of the mold is heated, causing bottom portions of the crystalline carbon fiber rope segments 400 to become less viscous. As shown in FIGS. 5H-5I, after the crystalline carbon fiber rope segments 400 are loaded into the mold 500, a top 520 of the mold 500 is closed on top of the crystalline carbon fiber rope segments 400. The top 520 includes a plurality of shaped surfaces that define inverse features of the final molded product. In the illustrated embodiment, the top 520 includes a plurality of fins 530. In alternative embodiments, the top may have more complex features. Additionally, the other surfaces of the mold may have additional features.

In one embodiment, as the top 520 is closed, the closure rate slows. When the top contacts the crystalline carbon fiber rope segments 400, pressure begins to build and the top portions of the crystalline carbon fiber rope segments 400 heat and becomes less viscous. The hot, low viscosity material of the crystalline carbon fiber rope segments 400 begins to flow, taking the line of least resistance. At the same time, the cooler, stiffer material that is left behind is compressed and pushed outward.

When the mold is fully closed, the pressure builds up until a predetermined molding pressure is reached. The material then cures inward from the edges. The material is held under pressure until the part is cured. The mold may include one or more bladders that expand to provide pressure on the component from an internal surface. After the part is cured, the top 520 is opened and the part is ejected from the mold 500. Ejector pins (not shown) may be employed to eject the part without causing damage.

In an alternative embodiment (not shown), the crystalline carbon fiber segments may be surrounded and encapsulated by thermoplastic or thermoset materials during the molding process. Additionally, the crystalline carbon fiber segments may be utilized in high-volume applications in injection mold or hybrid injection processes.

FIG. 5J illustrates a perspective view of an alternative embodiment of a mold 500j. The mold 500j includes a plurality of first openings 510j configured to mold heat pins, and a plurality of second openings 520j configured to mold heat blades. The plurality of first and second openings 510j, 520j are filled with molding material. For example, the plurality of first and second openings 510j, 520j may be filled with crystalline carbon fiber rope segments. Alternatively, the plurality of first and second openings 510j, 520j may be filled with a metallic substance. In one known embodiment, the plurality of first and second openings 510j, 520j are filled with crystalline carbon fiber rope segments having a metallic core. In another known embodiment, plurality of first and second openings 510j, 520j are filled with crystalline carbon fiber rope segments, and a metallic insert is added after the molding process is completed.

FIG. 5K illustrates the mold 500j in a closed position. The mold 500j is heated in the manner described above.

FIG. 5L illustrates a cross-section of the mold 500j taken along line L-L in FIG. 5K. As can be seen from this view, a plurality of heat pins 530j are being formed in the first openings 510j.

FIG. 5M illustrates a cross-section of the mold 500j taken along line M-M in FIG. 5K. As can be seen from this view, a plurality of heat blades 540j are being formed in the second openings 520j.

FIG. 5N illustrates a perspective view of the mold 500j in an open position after the molding process is complete. The plurality of heat pins 530j and heat blades 540j have been formed and may be removed from the mold.

A more complete description of FIGS. 5J-5N may be found in U.S. patent application Ser. No. 14/710,490, filed on May 12, 2015 by Rapid Unmanned Aerial Systems, LLC, the disclosure of which is incorporated by reference herein in its entirety.

Figure 6:
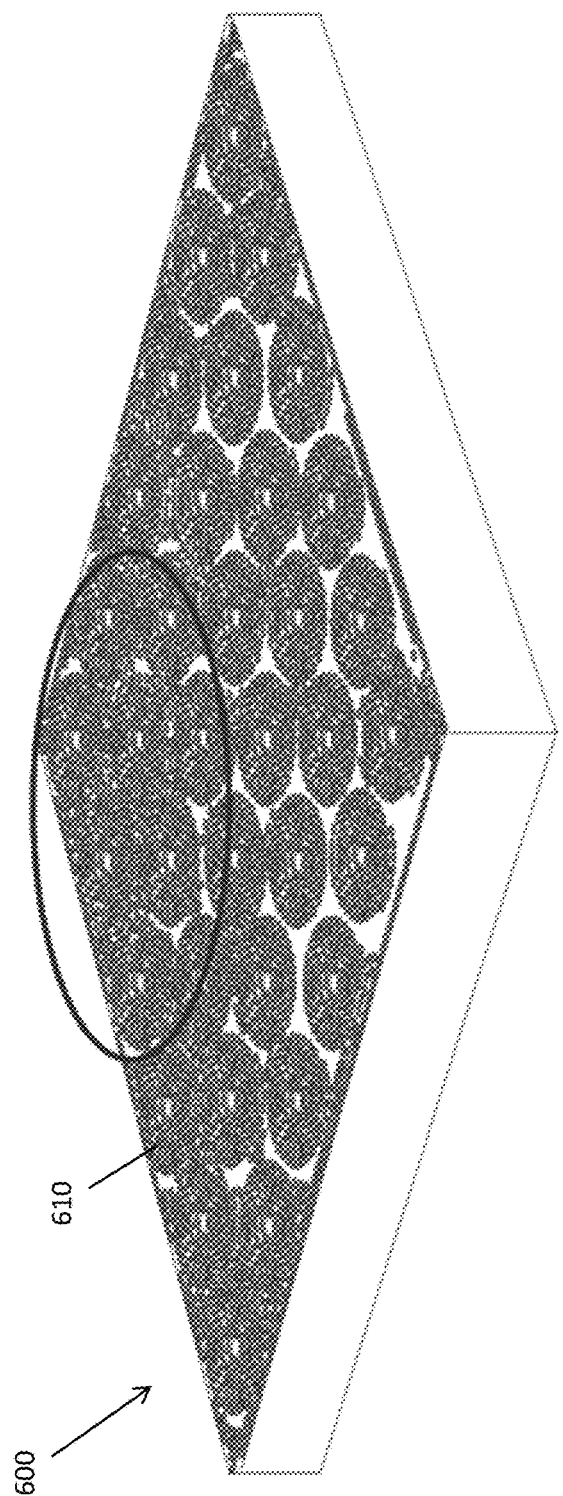
FIG. 6 is a schematic drawing illustrating a perspective view of a component formed by the mold 500.

FIG. 6 is a schematic drawing of a component 600 in the process of being formed by a mold 500. As can be seen in the illustrated embodiment, the component 600 includes a plurality of fibers 610 extending in substantially the same direction (i.e., from top to bottom). By aligning the fibers in this manner, the component 600 may more effectively transfer heat between the top surface and bottom surface. By contrast, heat may not be transferred as effectively in a lateral direction.

Because the component 600 is still in the process of being formed, some of the rope segments are at a lower temperature and have still maintained a distinct shape. By contrast, in the circled area, the rope segments have been heated sufficiently so that they have lost their form and individual strands are moving towards each other. As the molding process continues, the fibers will become more equally distributed throughout the component, and distinct segment shapes will no longer be visible.

From the above description of an exemplary UAV with reference to FIGS. 1 and 2A-E, and the description of thermally conductive materials with reference to FIGS. 3A-6, alternative embodiments of UAVs and alternative embodiments of locations of thermally conductive material should be apparent to those of ordinary skill in the art. However, additional examples of UAVs and UAV components are being provided in FIGS. 7-16. These examples are not intended to be limiting, but merely provide additional context.

Figure 7:
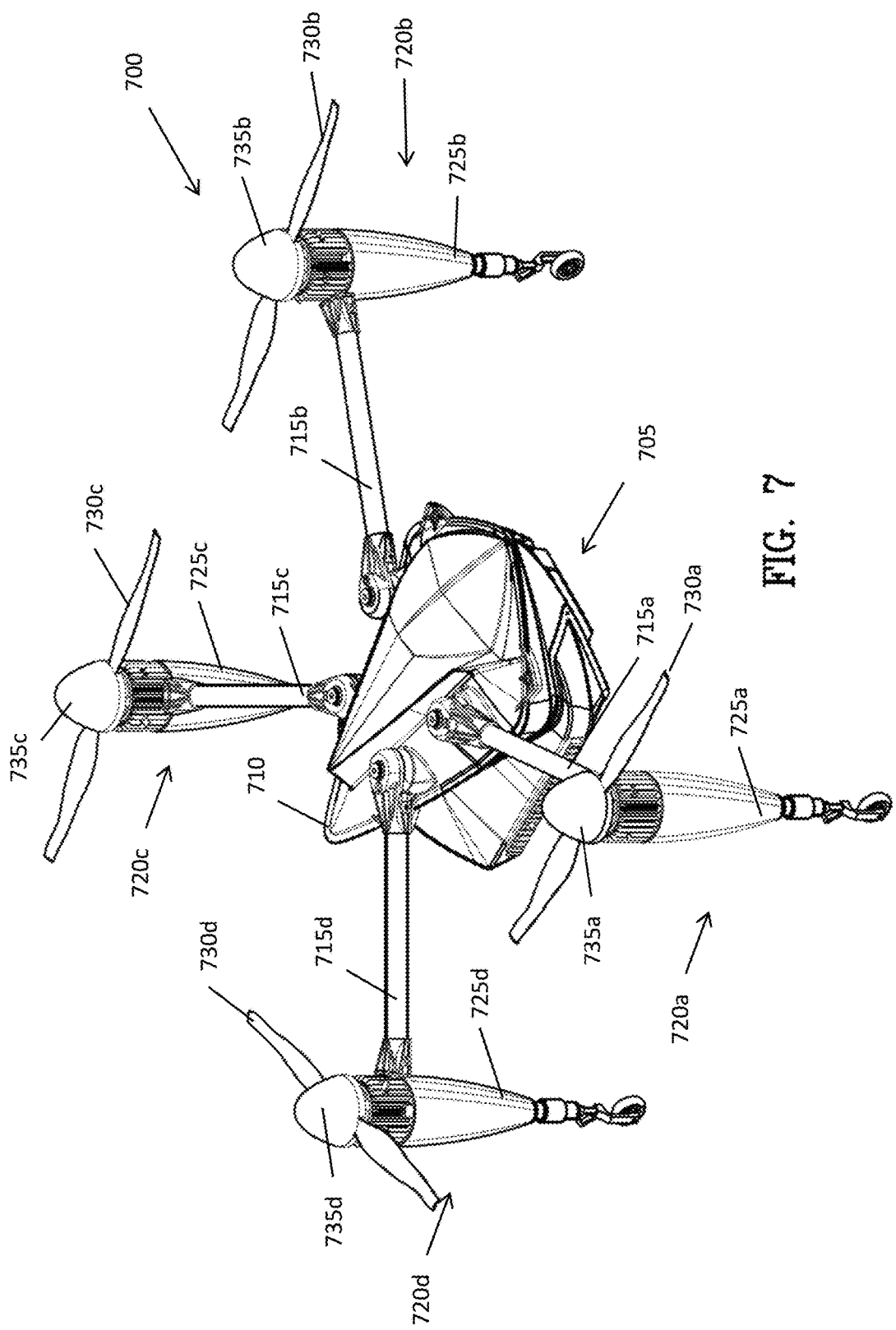
FIG. 7 is a perspective view of an alternative embodiment of an unmanned aerial vehicle.

FIG. 7 illustrates a perspective view of an alternative embodiment of a UAV 700. The UAV 700 is substantially the same as the UAV 100 of FIG. 1, except for the differences described herein. The UAV 700 may be constructed of the same materials and in the same manner as the UAVs 100 and 200 described above.

The UAV 700 includes a fuselage 705. The UAV 700 does not include the tail section 145 of UAV 100. A fuselage plug 710 may be utilized to engage an aperture that may exist between the upper and the lower surfaces of the fuselage 705 upon removal of the tail section.

The UAV 700 includes a first boom 715a, a second boom 715b, a third boom 715c, and a fourth boom 715d extending from the fuselage 705. In the illustrated embodiment, the booms 715a, 715b, 715c, 715d are rotatably connected to the fuselage 105. In an alternative embodiment (not shown) the booms are fixedly connected to the fuselage.

A first rotor assembly 720a is connected to the first boom 715a and a second rotor assembly 720b is connected to the second boom 715b. Additionally, a third rotor assembly 720c is connected to the third boom 715c and a fourth rotor assembly 720d is connected to the fourth boom 715d. Each rotor assembly 720a, 720b, 720c, 720d includes a nacelle 725a, 725b, 725c, 725d, a plurality of rotor blades 730a, 730b, 730c, 730d, and a nose cone 735a, 735b, 735c, 735d.

Figure 8:
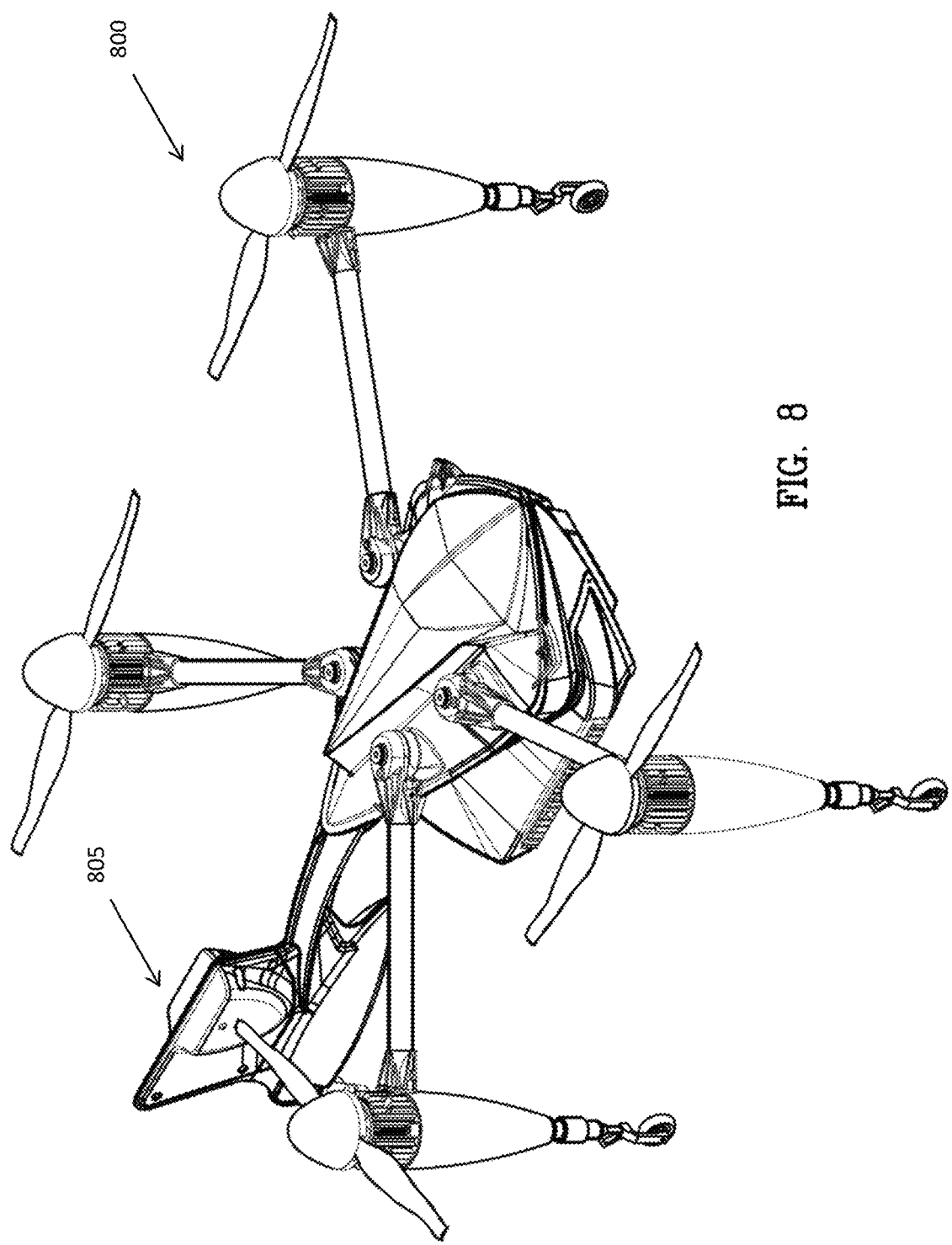
FIG. 8 is a perspective view of another alternative embodiment of an unmanned aerial vehicle.

FIG. 8 is a perspective view of another alternative embodiment of a UAV 800. The UAV 800 is substantially the same as the UAV 700 of FIG. 7, except for the differences described herein. The UAV 800 may be constructed of the same materials and in the same manner as the UAVs 100 and 200 described above. The UAV 800 includes a tail portion 805 that is substantially the same as the tail portion 145 of the UAV 100 of FIG. 1, except it does not include a rotor assembly.

Figure 9:
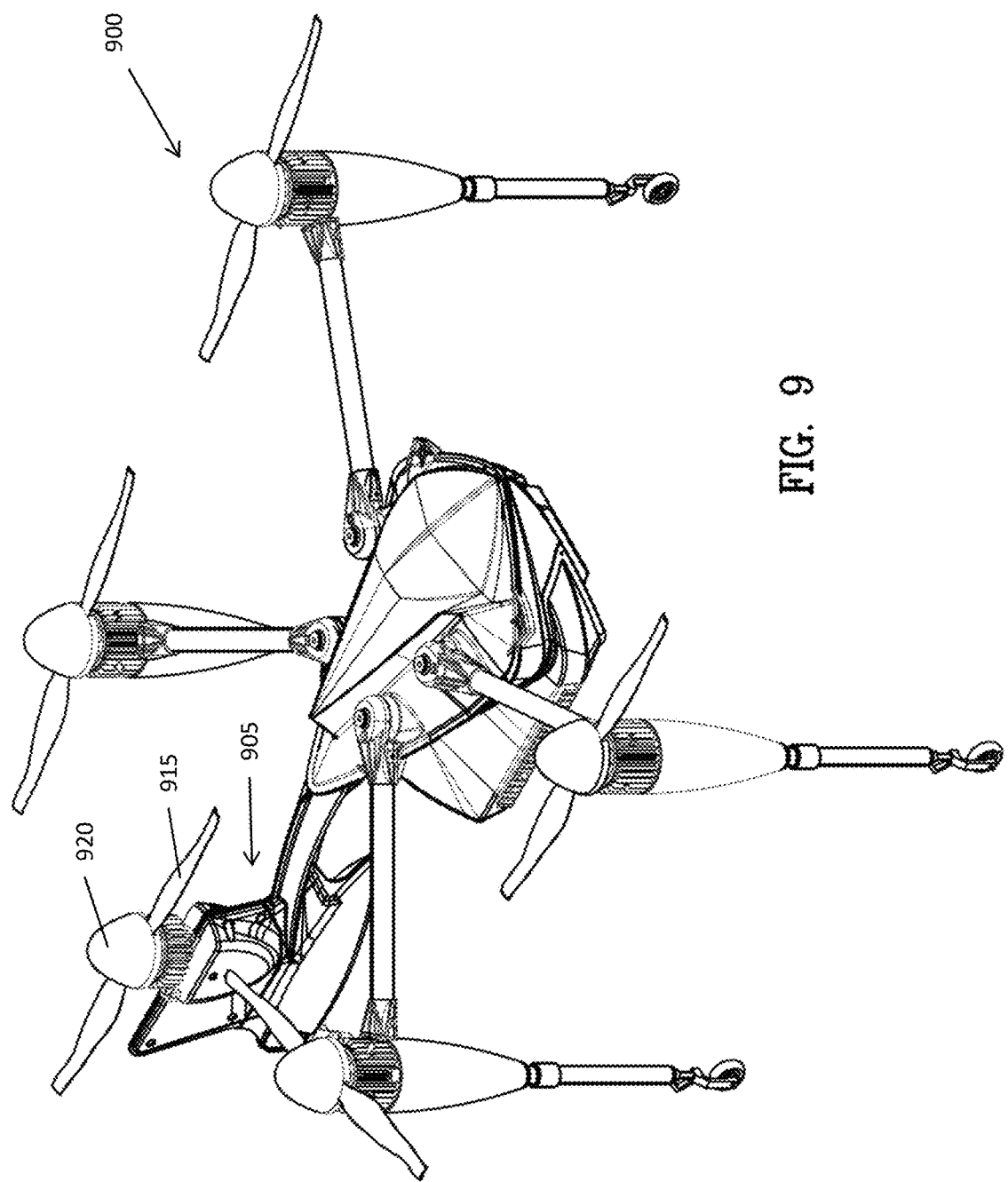
FIG. 9 is a perspective view of yet another alternative embodiment of an unmanned aerial vehicle.

FIG. 9 is a perspective view of yet another alternative embodiment of a UAV 900. The UAV 900 is substantially the same as the UAV 800 of FIG. 8, except for the differences described herein. The UAV 900 may be constructed of the same materials and in the same manner as the UAVs 100 and 200 described above. The UAV 900 includes a tail portion 905 that is substantially the same as the tail portion 145 of the UAV 100 of FIG. 1, and includes a rotor assembly 910 having a pair of rotor blades 915 and a nose cone 920.

Figure 10:
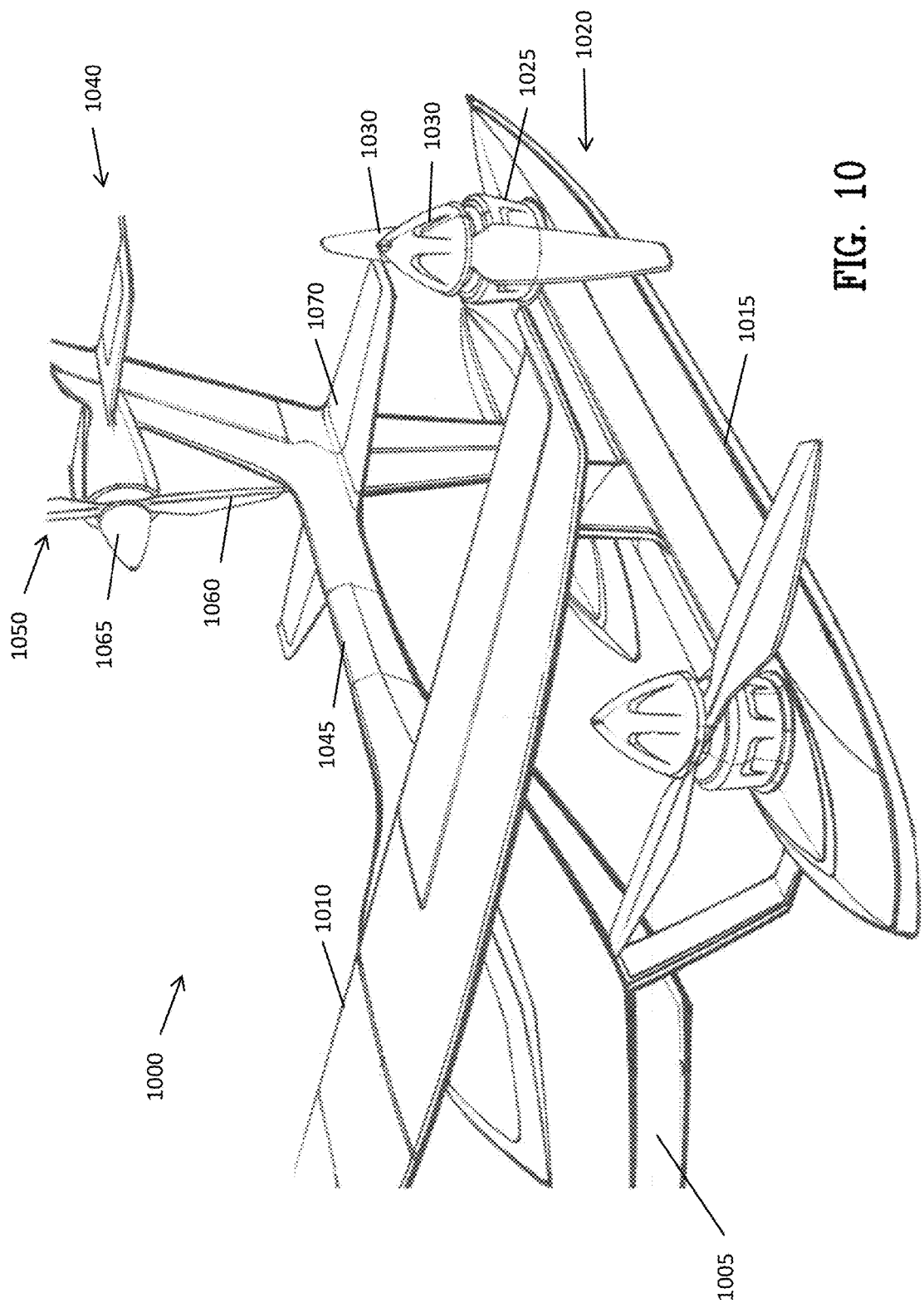
FIG. 10 is a perspective view of still another alternative embodiment of an unmanned aerial vehicle.

FIG. 10 is a perspective view of still another alternative embodiment of a UAV 1000. The UAV 1000 includes a fuselage 1005 and a fixed wing 1010. The UAV 1000 further includes a pair of sponsons 1015 (only one of which can be seen in this view). The sponsons 1015 each house a pair of rotor assemblies 1020. Each rotor assembly 1020 includes a nacelle 1025, a pair of rotor blades 1030, and a nose cap 1035.

The UAV 1000 also includes a tail section 1040 connected to the fuselage 1005 via a tail 1045. The tail section includes a rotor assembly 1050, which includes a nacelle 1055, a pair of rotor blades 1060, and a nose cap 1065. The tail section further includes a plurality of stabilizer wings 1070.

The body of the UAV 1000 may house various electric and mechanical components in the same manner described above with reference to UAV 100 of FIG. 1. The UAV 1000 may be constructed of the same materials and in the same manner as the UAVs 100 and 200 described above.

Figure 11A:
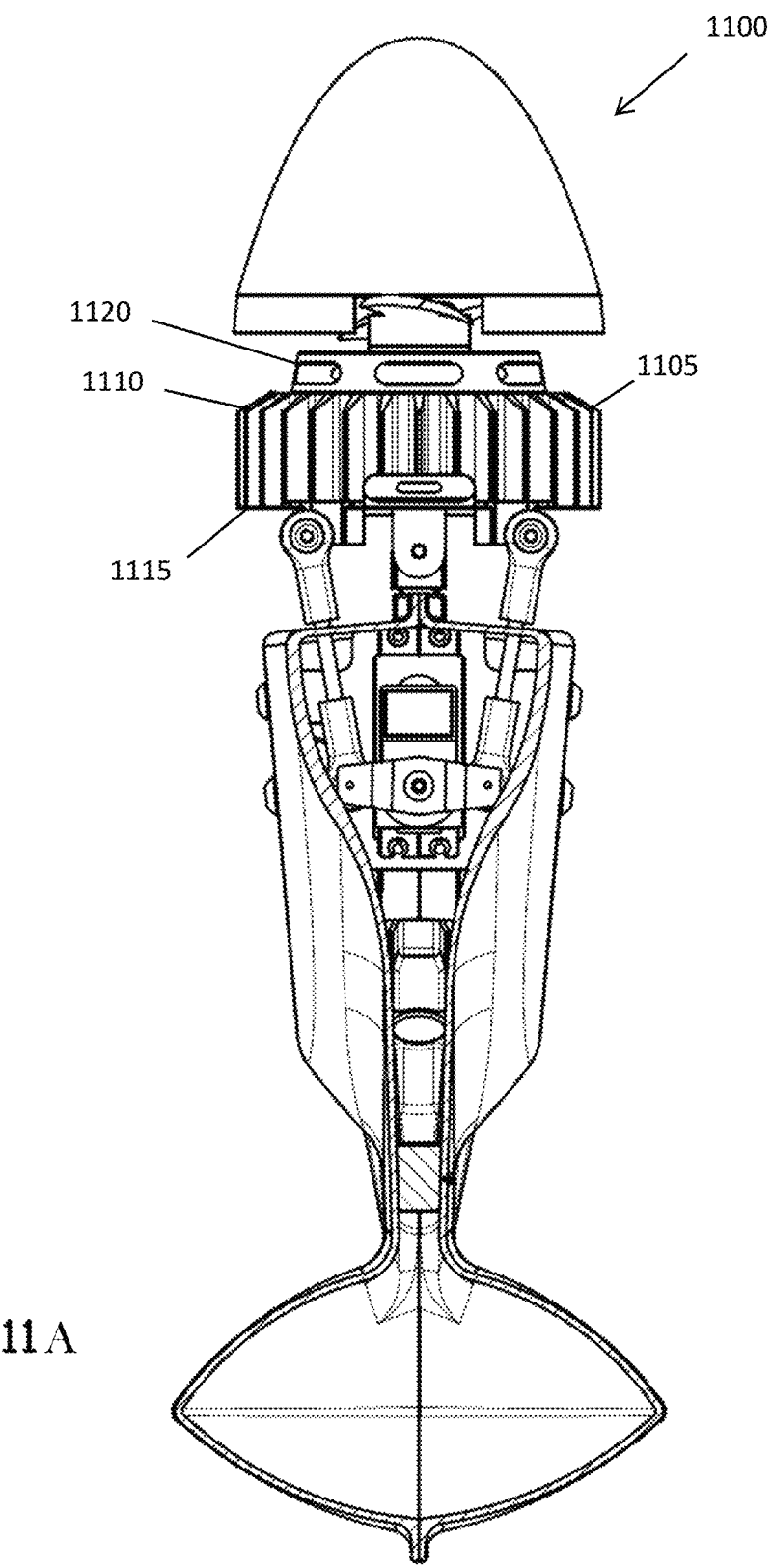
FIG. 11A illustrates a partial cross-section of a rotor assembly 1100.
Figure 11B:
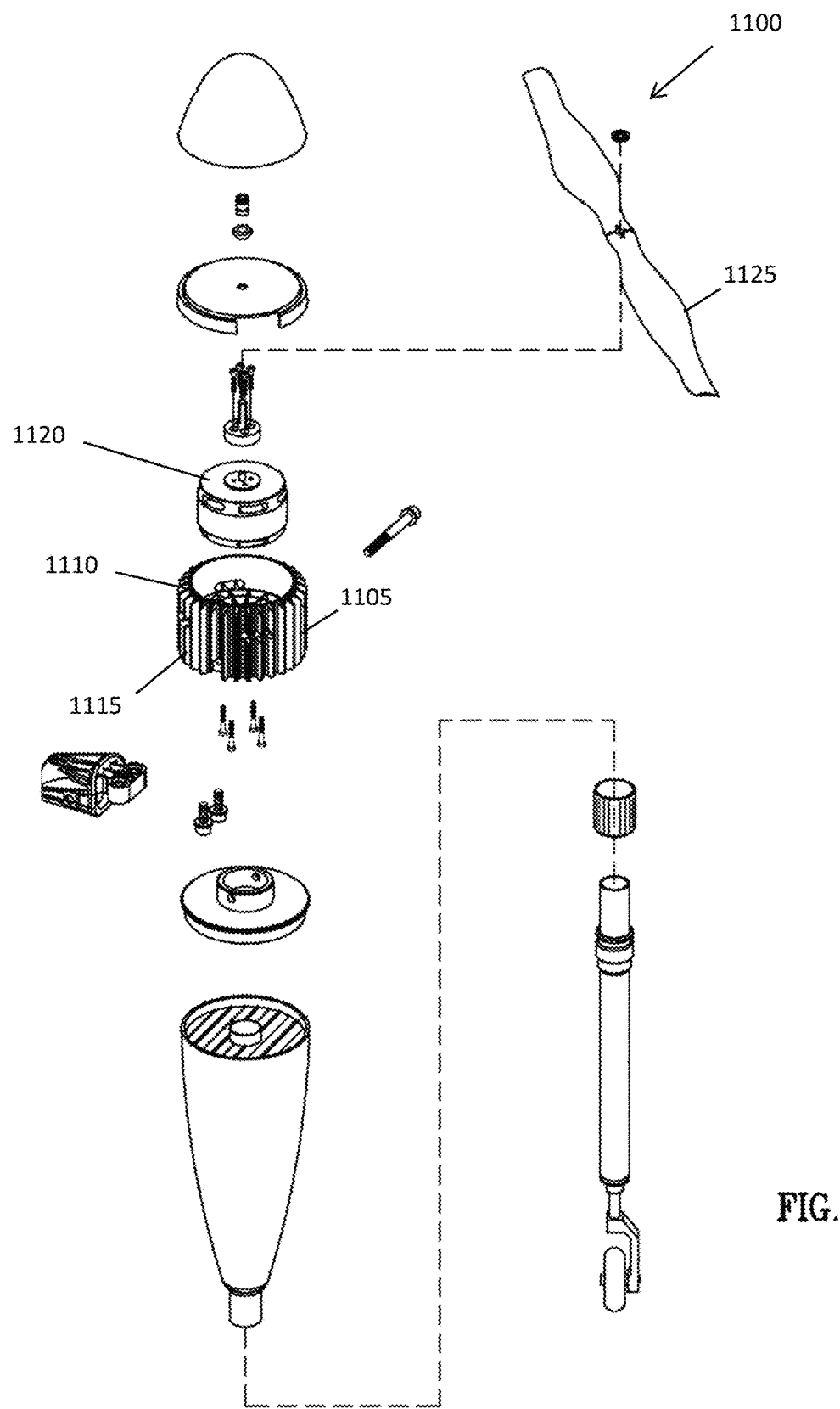
FIG. 11B illustrates an exploded view of the rotor assembly 1100.

FIGS. 11A and 11B illustrate a partial cross-section and an exploded view, respectively, of a rotor assembly 1100. The rotor assembly 1100 is an exemplary rotor that may be used in any of the UAV embodiments shown and described above. The rotor assembly 1100 may be disposed horizontally, vertically, or at an acute angle with respect to the body of the UAV. The rotor assembly 1100 includes a motor housing 1105 having an upper end 1110 and a lower end 1115. The motor housing 1105 receives a motor 1120. The motor 1120 rotates a plurality of rotor blades 1125 above the motor housing 1105.

In one embodiment, the rotor assembly 1100 includes pivoting components that are controlled to allow portions of the rotor to pivot with respect to the body of a UAV. In an alternative embodiment, the rotor assembly does not pivot. The rotor assembly 1100 may be constructed of the same materials and in the same manner as the rotor assemblies 120 described above with respect to FIG. 1.

Figure 12:
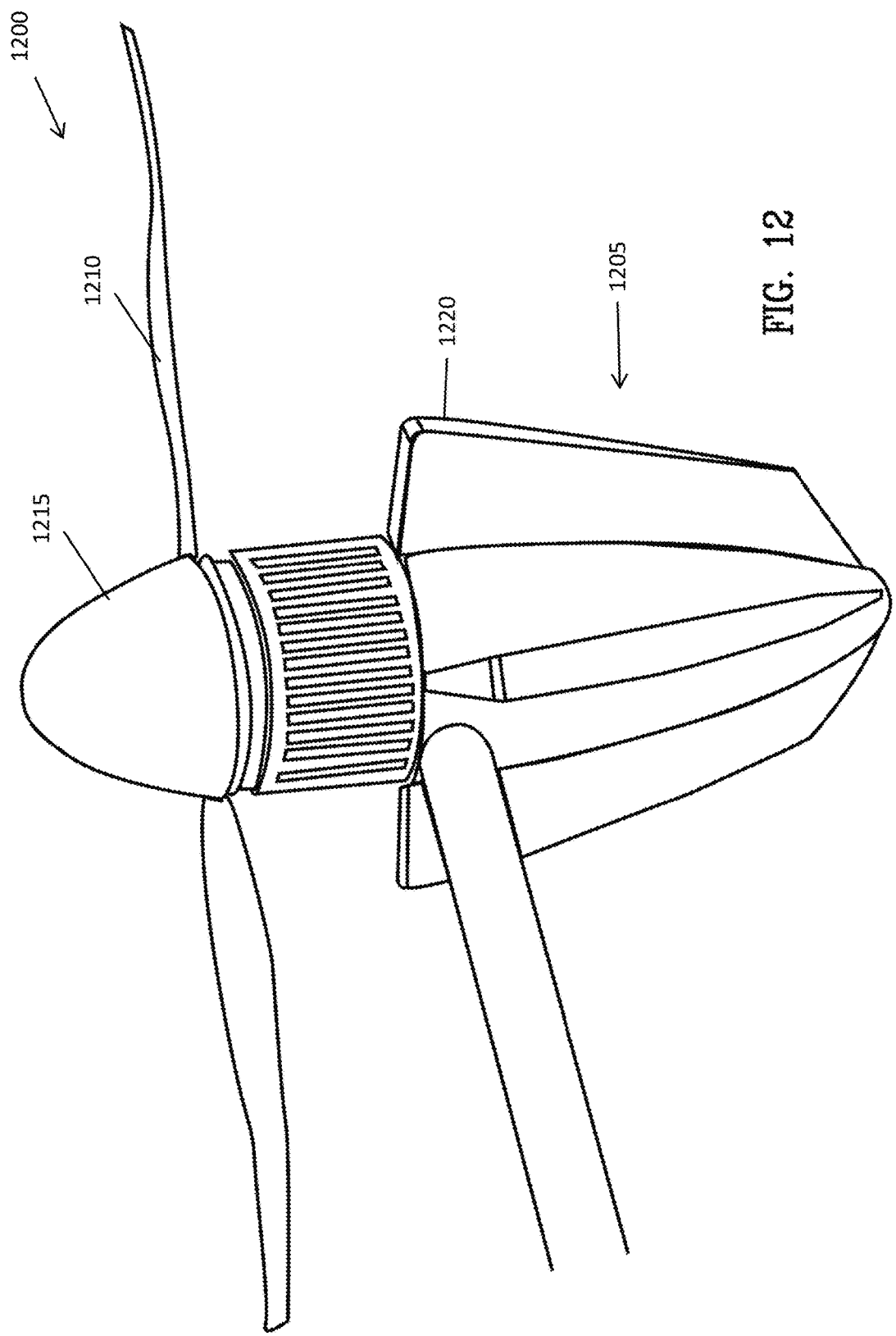
FIG. 12 is a perspective view of an alternative embodiment of a rotor assembly.

FIG. 12 is a perspective view of an alternative embodiment of a rotor assembly 1200. The rotor assembly 1200 includes a nacelle 1205, a plurality of rotor blades 1210, and a nose cone 1215. The nacelle 1205 includes a plurality of cooling blades 1220. The rotor assembly 1200 may be constructed of the same materials and in the same manner as the rotor assemblies 120 described above with respect to FIG. 1.

Figure 13:
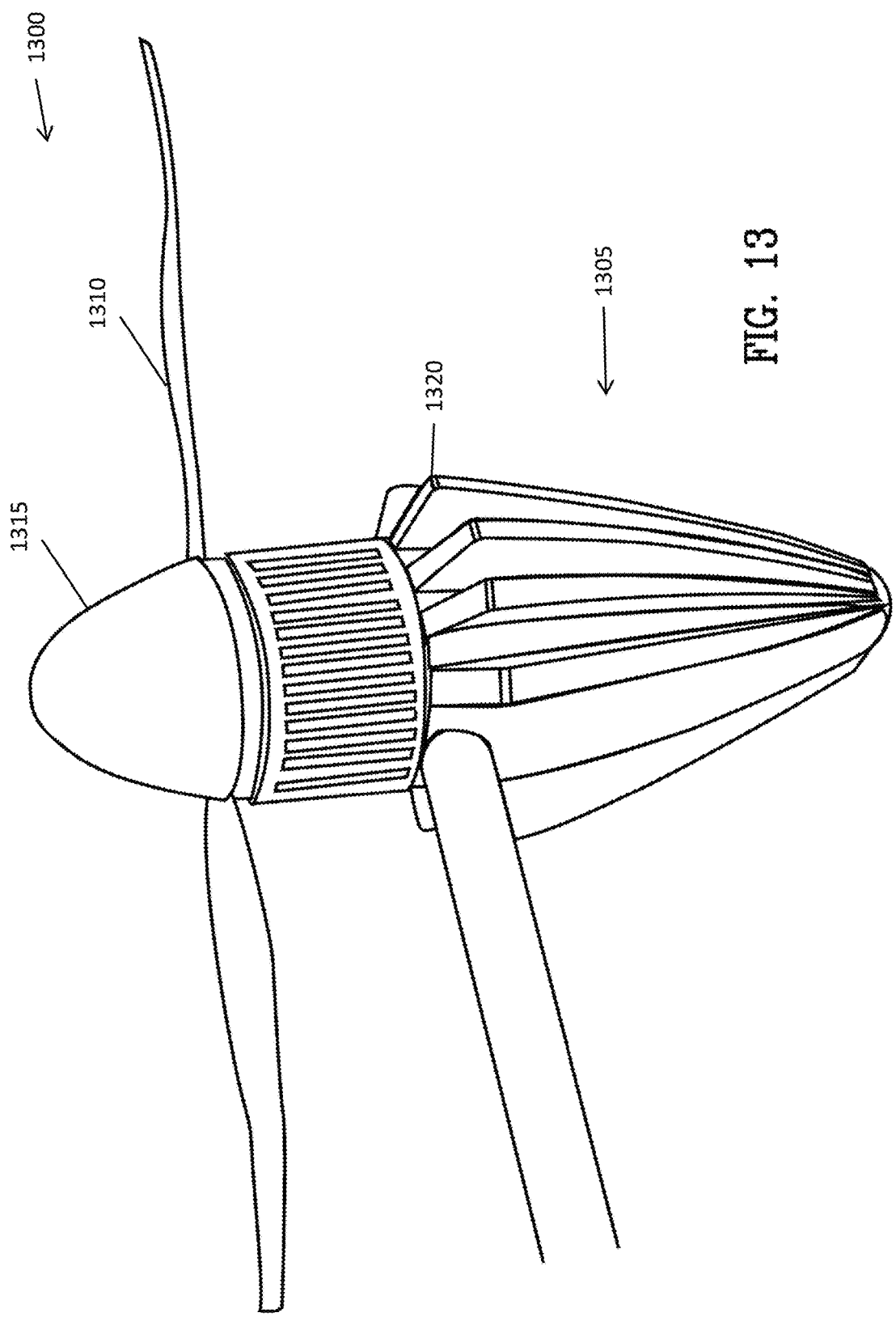
FIG. 13 is a perspective view of another alternative embodiment of a rotor assembly.

FIG. 13 is a perspective view of another alternative embodiment of a rotor assembly 1300. The rotor assembly 1300 includes a nacelle 1305, a plurality of rotor blades 1310, and a nose cone 1315. The nacelle 1305 includes a plurality of cooling blades 1320. The cooling blades 1320 are disposed about the nacelle 1305 at a higher density than the cooling blades 1220 shown in FIG. 12. The rotor assembly 1300 may be constructed of the same materials and in the same manner as the rotor assemblies 120 described above with respect to FIG. 1.

Figure 14:
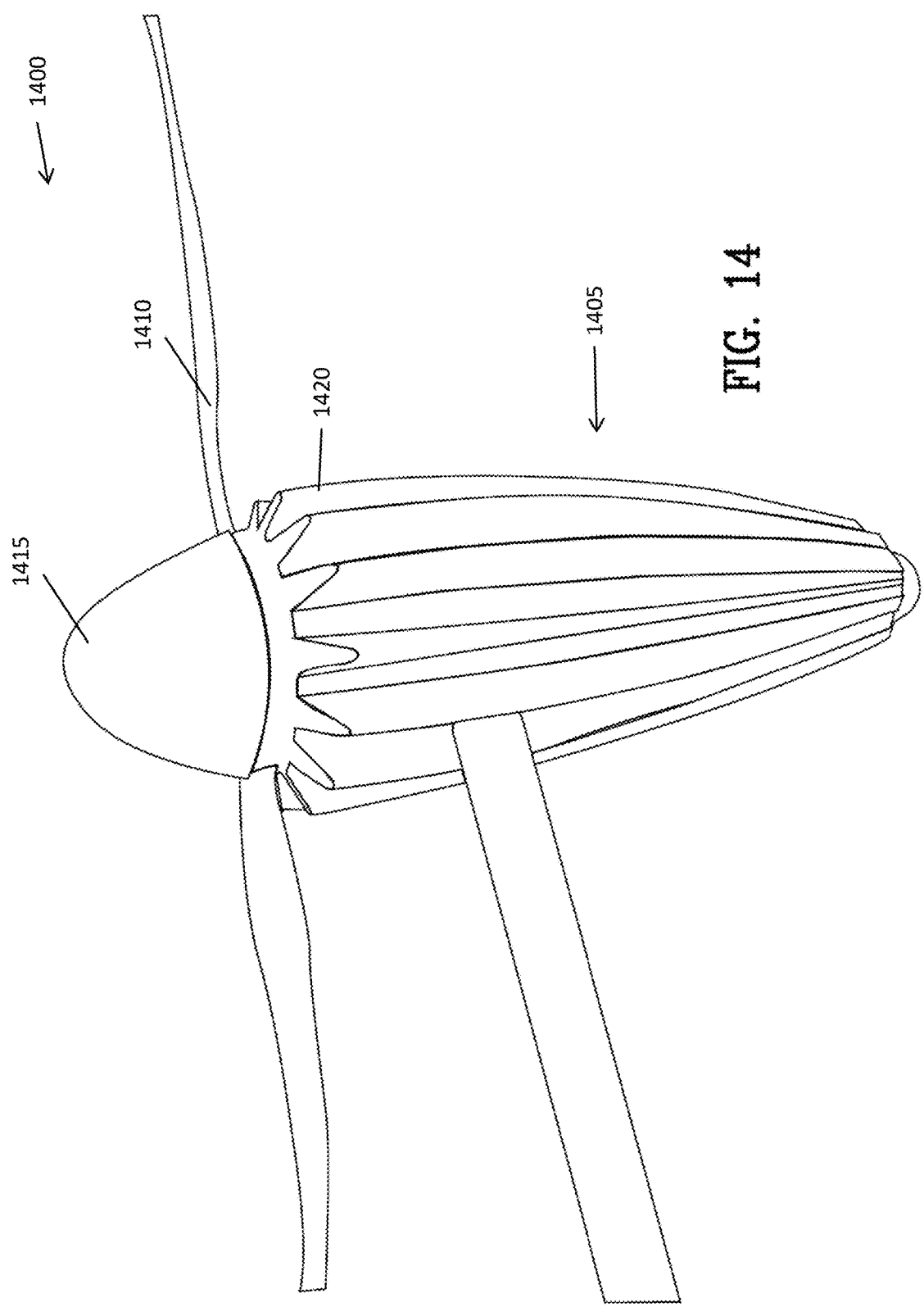
FIG. 14 is a perspective view of yet another alternative embodiment of a rotor assembly.

FIG. 14 is a perspective view of yet another alternative embodiment of a rotor assembly 1400. The rotor assembly 1400 includes a nacelle 1405, a plurality of rotor blades 1410, and a nose cone 1415. The nacelle 1405 includes a plurality of cooling blades 1420. The cooling blades 1420 are more elongated than the cooling blades 1320 shown in FIG. 13. The rotor assembly 1400 may be constructed of the same materials and in the same manner as the rotor assemblies 120 described above with respect to FIG. 1.

Figure 15:
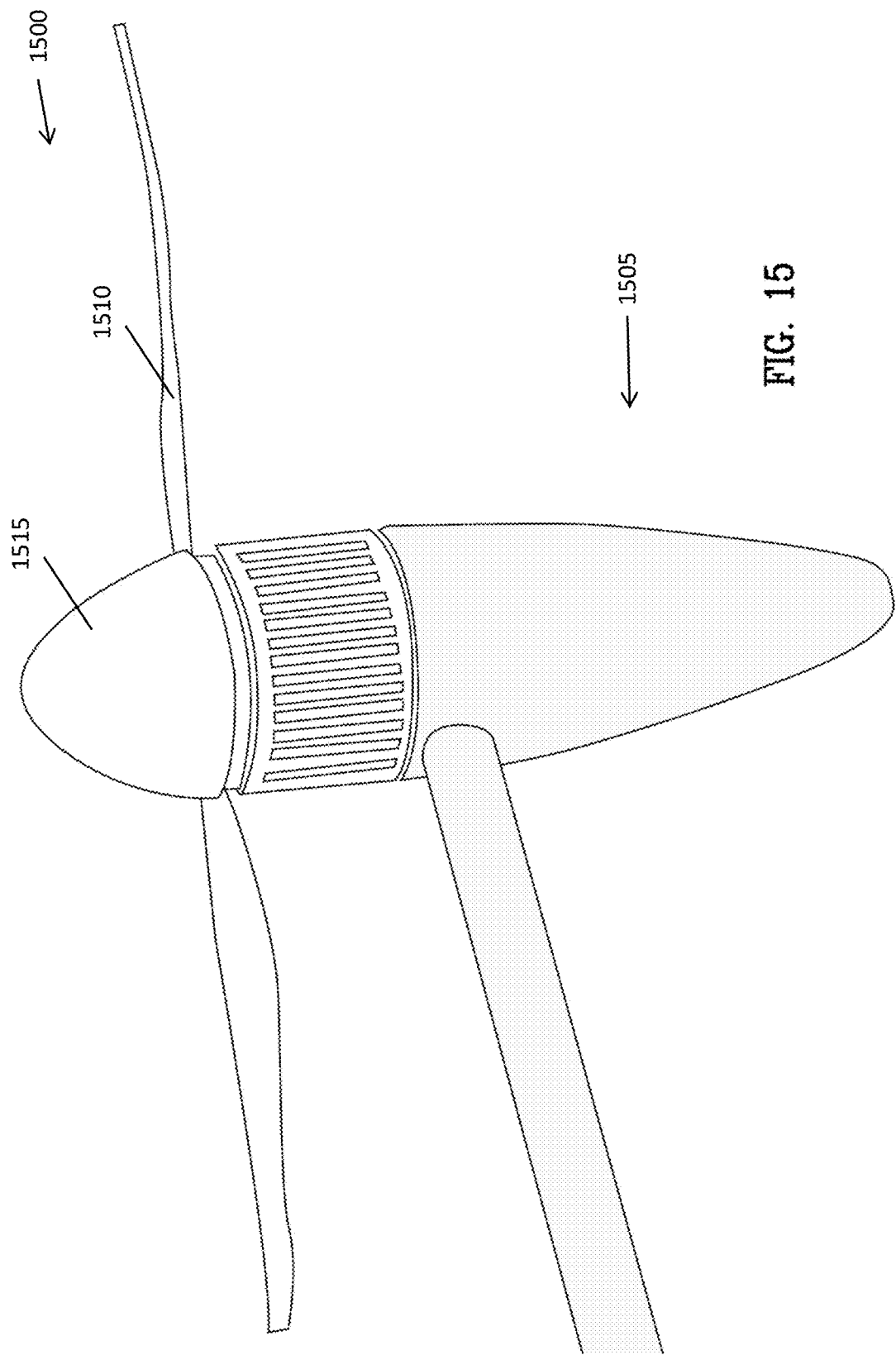
FIG. 15 is a perspective view of still another alternative embodiment of a rotor assembly.

FIG. 15 is a perspective view of still another alternative embodiment of a rotor assembly 1500. The rotor assembly 1500 includes a nacelle 1505, a plurality of rotor blades 1510, and a nose cone 1515. The nacelle 1505 does not include any cooling blades. The rotor assembly 1500 may be constructed of the same materials and in the same manner as the rotor assemblies 120 described above with respect to FIG. 1.

FIG. 16 is a perspective view of yet another alternative embodiment of a rotor assembly 1600. The rotor assembly 1600 includes a nacelle 1605, a plurality of rotor blades 1610, and a nose cone 1615. The nacelle 1605 includes a plurality of cooling blades 1620. The cooling blades 1620 include a plurality of cutouts 1625 that further increase the surface area of the rotor assembly 1600. The rotor assembly 1600 may be constructed of the same materials and in the same manner as the rotor assemblies 120 described above with respect to FIG. 1.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

What is claimed is:

1. An unmanned aerial vehicle comprising:
   a fuselage;
   an electronic controller system disposed in the fuselage; and
   a plurality of rotor lift assemblies connected to the fuselage, each rotor lift assembly including a plurality of rotor blades, a nose cone, and a nacelle housing a motor,
   wherein at least a portion of one of the fuselage and nacelle is constructed of crystalline carbon fibers.

2. The unmanned aerial vehicle of claim 1, further comprising a tail section connected to the fuselage.

3. The unmanned aerial vehicle of claim 1, wherein the crystalline carbon fibers are selected from the group consisting of pitch fiber, graphite, buckypaper, carbon nano materials, graphene, and PEMTEX.

4. The unmanned aerial vehicle of claim 1, wherein the crystalline carbon fiber portion is proximate to at least one of the plurality of rotors.

5. The unmanned aerial vehicle of claim 1, wherein the crystalline carbon fiber portion includes a first portion proximate to one of the motor and the electronic controller system, and a second portion proximate to at least one of the plurality of rotors.

6. The unmanned aerial vehicle of claim 5, wherein the crystalline carbon fiber portion further includes a crystalline carbon fiber path extending from the first portion to the second portion.

7. The unmanned aerial vehicle of claim 1, wherein substantially all of the crystalline carbon fibers are oriented in a same direction.

8. The unmanned aerial vehicle of claim 1, wherein the crystalline carbon fiber portion is constructed from one of a slurry of crystalline carbon fibers and a fabric of woven crystalline carbon fibers.

9. The unmanned aerial vehicle of claim 1, wherein the crystalline carbon fiber portion is constructed from a rope of crystalline carbon fiber.

10. The unmanned aerial vehicle of claim 1, wherein the crystalline carbon fiber portion is constructed of crystalline carbon fiber and at least one other material selected from the group consisting of polyacrylonitrile fibers, aramid fibers, thermoplastic, thermoset, and boron nitride.

11. An unmanned aerial vehicle comprising:
    a body;
    a heat source enclosed by the body such that the heat source is not exposed to an exterior of the body, wherein the heat source includes at least one of an electronic controller system and a motor; and
    a plurality of rotor blades,
    wherein at least a portion of the body is constructed of crystalline carbon fibers.

12. The unmanned aerial vehicle of claim 11, wherein the body includes a fuselage, a tail portion, and a plurality of rotor assemblies.

13. The unmanned aerial vehicle of claim 11, wherein the portion of the body constructed of crystalline carbon fibers further includes polyacrylonitrile fibers.

14. The unmanned aerial vehicle of claim 11, wherein the crystalline carbon fibers are pitch fibers.

15. The unmanned aerial vehicle of claim 11, wherein the crystalline carbon fiber portion is constructed from a rope of crystalline carbon fiber.

* * * * *